(12) United States Patent
Sakiyama

(10) Patent No.: US 12,047,354 B2
(45) Date of Patent: Jul. 23, 2024

(54) IMAGE PROCESSING APPARATUS FOR DISPLAYING DESTINATION INFORMATION RECEIVED FROM A TERMINAL DEVICE

(71) Applicant: SHARP KABUSHIKI KAISHA, Sakai (JP)

(72) Inventor: Masahiro Sakiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 78 days.

(21) Appl. No.: 17/748,257

(22) Filed: May 19, 2022

(65) Prior Publication Data
US 2022/0385640 A1 Dec. 1, 2022

(30) Foreign Application Priority Data

May 26, 2021 (JP) .................................. 2021-088793

(51) Int. Cl.
| | | |
|---|---|---|
| *H04N 1/00* | (2006.01) | |
| *H04L 9/40* | (2022.01) | |
| *H04N 1/32* | (2006.01) | |
| *H04N 1/44* | (2006.01) | |

(52) U.S. Cl.
CPC ..... *H04L 63/0407* (2013.01); *H04N 1/32128* (2013.01); *H04N 1/44* (2013.01); *H04N 2201/3208* (2013.01); *H04N 2201/3209* (2013.01)

(58) Field of Classification Search
CPC .................................................. H04N 1/32128
See application file for complete search history.

(56) References Cited

U.S. PATENT DOCUMENTS

| | | | |
|---|---|---|---|
| 2014/0293328 A1* | 10/2014 | Wakizaka | G06F 3/1221 358/1.15 |
| 2016/0219190 A1* | 7/2016 | Sugiyama | H04L 51/42 |
| 2017/0374211 A1* | 12/2017 | Saito | G06F 3/1286 |
| 2017/0374230 A1* | 12/2017 | Song | H04N 1/00408 |
| 2018/0069972 A1* | 3/2018 | Kawamoto | H04L 67/02 |
| 2019/0364159 A1* | 11/2019 | Saeda | H04N 1/346 |
| 2020/0028983 A1* | 1/2020 | Saito | H04N 1/00474 |
| 2021/0357159 A1* | 11/2021 | Furuta | G06F 3/1267 |

FOREIGN PATENT DOCUMENTS

JP 2016-134042 A 7/2016

\* cited by examiner

*Primary Examiner* — Benjamin O Dulaney
(74) *Attorney, Agent, or Firm* — ScienBiziP, P.C.

(57) ABSTRACT

An image processing apparatus includes a controller, a displayer, a communicator, and a near field communicator. The controller receives, from a terminal device, a display image associated with destination information stored by the terminal device, via the near field communicator, displays, on the displayer, a screen including the display image, receives, from the terminal device, the destination information, based on an operation input to the screen, and transmits an image for transmission via the communicator, based on the destination information received from the terminal device.

16 Claims, 21 Drawing Sheets

FIG. 3

| USER NAME | FURIGANA | COMPANY NAME | PHONE NUMBER | FAX NUMBER | E-MAIL ADDRESS |
|---|---|---|---|---|---|
| TANAKA ICHIRO | TANAKA ICHIRO | COMPANY A | 03-1111-2222 | 03-1111-2223 | tanaka@a-sha.com |
| SUZUKI JIRO | SUZUKI JIRO | COMPANY B | 03-1234-5678 | 03-1234-5679 | j.suzuki@b-sha.com |
| ⋮ | ⋮ | ⋮ | ⋮ | ⋮ | ⋮ |

FIG. 5

| FAMILY NAME | FURIGANA | FAX NUMBER | E-MAIL ADDRESS | MEMO |
|---|---|---|---|---|
| ITOU SABURO | ITOU SABURO | 03-2345-6789 | itou@c-sha.com | SALES DEPARTMENT |
| SATOH SHIRO | SATOH SHIRO | 06-0000-1111 | s.satoh@d-sha.com | – |
| ⋮ | ⋮ | ⋮ | ⋮ | ⋮ |

FIG. 17A

| FAMILY NAME | FAMILY NAME FURIGANA | NAME | NAME FURIGANA | COMPANY NAME | PHONE NUMBER | FAX NUMBER | E-MAIL ADDRESS | NICKNAME | USER IMAGE |
|---|---|---|---|---|---|---|---|---|---|
| TANAKA | TANAKA | ICHIRO | ICHIRO | COMPANY A | 03-1111-2222 | 03-1111-2223 | tanaka@ a-sha.com | TANAKA@SALES DEPARTMENT | -- |
| SUZUKI | SUZUKI | JIRO | JIRO | COMPANY B | 03-1234-5678 | 03-1234-5679 | j.suzuki@ b-sha.com | -- | 20210310142352.jpg |
| ... | ... | ... | ... | ... | ... | ... | ... | ... | ... |

FIG. 20A

| FAMILY NAME | FAMILY NAME FURIGANA | NAME | NAME FURIGANA | COMPANY NAME | PHONE NUMBER | FAX NUMBER | E-MAIL ADDRESS | ACCOUNT NAME |
|---|---|---|---|---|---|---|---|---|
| TANAKA | TANAKA | ICHIRO | ICHIRO | COMPANY A | 03-1111-2222 | 03-1111-2223 | tanaka@a-sha.com | user1 |
| SUZUKI | SUZUKI | JIRO | JIRO | COMPANY B | 03-1234-5678 | 03-1234-5679 | j.suzuki@b-sha.com | user2 |
| : | : | : | : | : | : | : | : | : |

IMAGE PROCESSING APPARATUS FOR DISPLAYING DESTINATION INFORMATION RECEIVED FROM A TERMINAL DEVICE

BACKGROUND OF THE INVENTION

Field of the Invention

The present disclosure relates to an image processing apparatus and the like.

Description of the Background Art

Conventionally, digital multifunction machines (MFP: Multi-Function Peripheral/Printer) having a copy function, a print function, a scanner function, a mail transmission function, and the like have been widely used. Further, some multifunction machines also have a function of transmitting, to a destination designated by a user, an image of a document read by a scanner function.

Further, techniques for acquiring, from another device, information on a destination to which an image is to be transmitted have also been proposed. For example, a technique has been proposed in which an image processing apparatus performs wireless communication with a user's mobile terminal device to acquire and store address identification information (e.g., a registration number and address information) for identifying an address from among destination information registered in the mobile terminal device, and when data are transmitted and received, an address associated with address identification information selected by the user is acquired from the mobile terminal device.

When destination information (e.g., phone book information) stored in a mobile terminal device such as a smartphone is transferred to a device such as a navigation system of an automobile, a user of which is substantially identified to be the owner himself or herself in most cases, it is conceived that transferring all phone book information enhances user's convenience. However, in a case where phone book information is transferred to a device such as a multifunction machine, which is used by a large number of unidentified persons, there is a concern that destination information stored in a mobile terminal device may be known to others. As a measure against this concern, a method is proposed in which destination information received from a mobile terminal device is discarded at a point of time when a multifunction machine has completed necessary processing. However, even if such a measure is taken, there still remains a psychological barrier in temporarily transferring destination information to a multifunction machine.

In the technique, there exists a psychological barrier as described above, because address identification information is stored in a multifunction machine, albeit on the basis of users.

In view of the above-described issue, an object of the present disclosure is to provide an image processing apparatus and the like that enable to select a transmission destination by simply acquiring a minimum number of pieces of destination information stored in a terminal device.

SUMMARY OF THE INVENTION

In order to solve the above-described issue, an image processing apparatus according to the present disclosure includes a controller, a displayer, a communicator, and a near field communicator. The controller receives, from a terminal device, a display image associated with destination information stored in the terminal device, via the near field communicator, displays a screen including the display image on the displayer, receives the destination information from the terminal device, based on an operation input to the screen, and transmits an image for transmission via the communicator, based on the destination information received from the terminal device.

A control method according to the present disclosure includes: receiving, from a terminal device, a display image associated with destination information stored in the terminal device, by near field communication; displaying a screen including the display image; receiving the destination information from the terminal device, based on an operation input to the screen; and transmitting an image for transmission, based on the destination information received from the terminal device.

A system according to the present disclosure is a system including a terminal device and an image processing apparatus. The terminal device transmits, to the image processing apparatus, a display image associated with destination information. When information indicating an operation input to a screen including the display image is received from the image processing apparatus, the terminal device transmits, to the image processing apparatus, the destination information associated with the operation. The image processing apparatus displays a screen including the display image, transmits, to the terminal device, information indicating the operation input to the screen, and transmits an image for transmission, based on the destination information received from the terminal device.

According to the present disclosure, it becomes possible to provide an image processing apparatus and the like that enable to select a transmission destination by simply acquiring information on a minimum number of pieces of destination information stored in a terminal device.

BRIEF DESCRIPTION OF THE DRAWINGS

FIG. 3 is a table illustrating an example of a data structure of phone book data according to the first embodiment.

FIG. 5 is a table illustrating an example of a data structure of address book data according to the first embodiment.

FIG. 17A is a diagram illustrating a data structure of phone book data.

FIG. 20A is a diagram illustrating a data structure of phone book data.

DESCRIPTION OF THE PREFERRED EMBODIMENTS

Hereinafter, embodiments for implementing the present disclosure are described with reference to the drawings. Note that, the following embodiments are an example for describing the present disclosure, and the technical scope of the disclosure described in the claims is not limited to the following description.

1. First Embodiment

1.1 Overall Configuration

Figure 1:
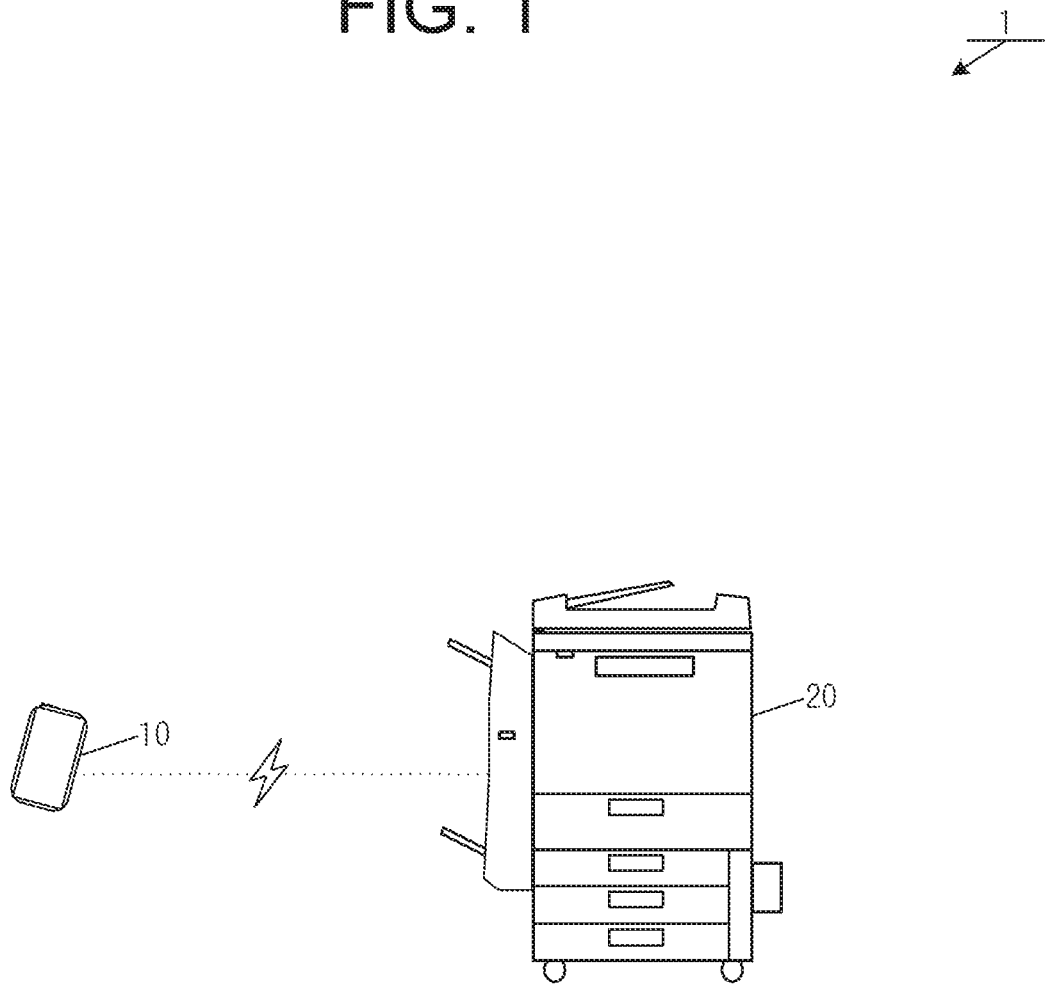
FIG. 1 is a diagram illustrating an overall configuration of a system according to a first embodiment.

A system 1 according to the present embodiment is described with reference to FIG. 1. As illustrated in FIG. 1, the system 1 according to the present embodiment is configured to include a terminal device 10 and an image processing apparatus 20. In addition, the terminal device 10 and the image processing apparatus 20 have a function of performing near field communication.

The terminal device 10 is an information processing device used by a user. The terminal device 10 is a device such as, for example, a smartphone or a tablet. Note that, the terminal device 10 may be a device such as a smartwatch, a personal computer (PC), or a personal digital assistant (PDA).

The image processing apparatus 20 is an apparatus having a copy function, a print function, a scanner function, a mail function, a facsimile transmission function, and the like, and is an apparatus generally called a digital multifunction machine (MFP). Note that, the image processing apparatus 20 may be an image forming apparatus including a means that forms an image on recording paper such as paper or an OHP film by using a method such as an electrophotographic method.

1.2 Functional Configuration

1.2.1 Terminal Device

Figure 2:
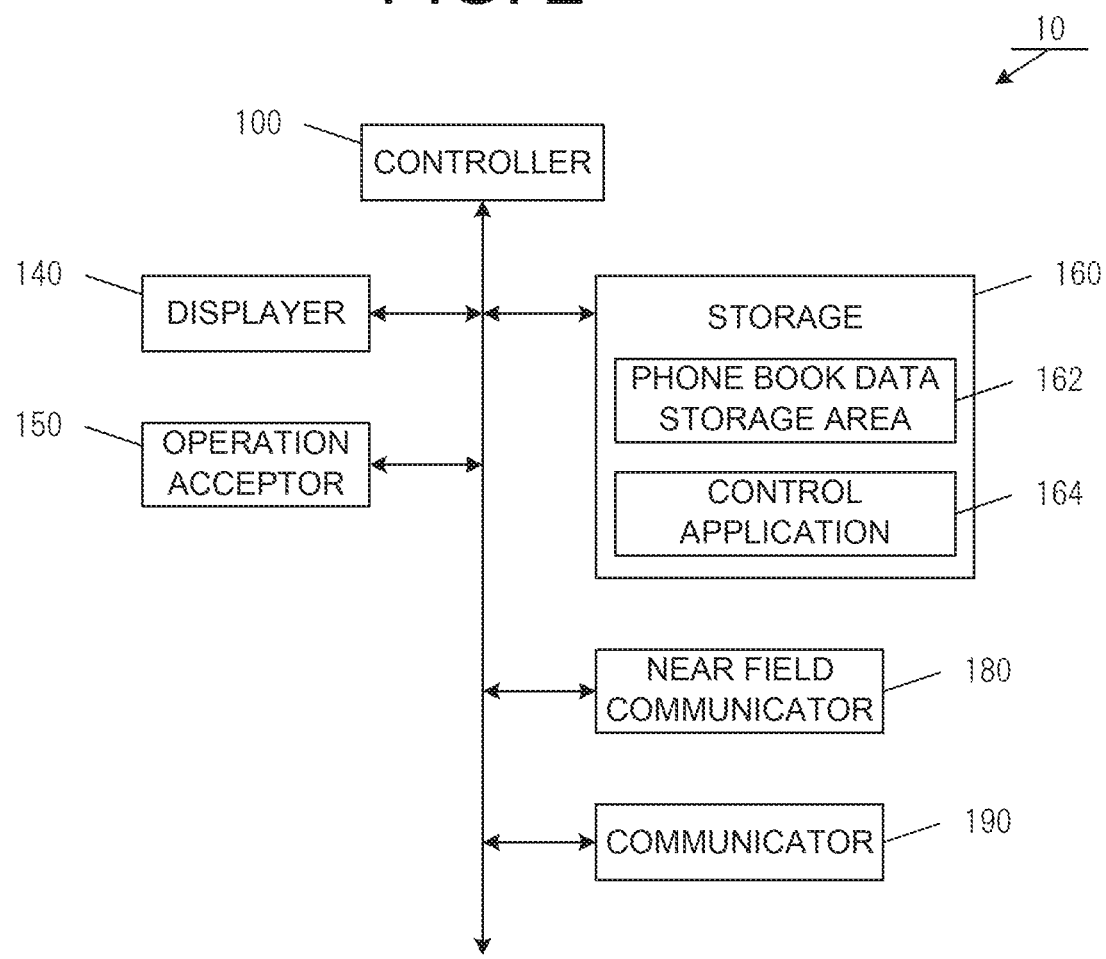
FIG. 2 is a diagram illustrating a functional configuration of a terminal device according to the first embodiment.

A configuration of the terminal device 10 according to the present embodiment is described with reference to FIG. 2. As illustrated in FIG. 2, the terminal device 10 is configured to include a controller 100, a displayer 140, an operation acceptor 150, a storage 160, a near field communicator 180, and a communicator 190.

The controller 100 controls the entirety of the terminal device 10. The controller 100 achieves various functions by reading and executing various programs stored in the storage 160, and is configured of one or more arithmetic devices (e.g., central processing units (CPUs)).

The displayer 140 displays various pieces of information. The displayer 140 is configured of a display device such as, for example, a liquid crystal display (LCD), an organic electro-luminescence (EL) panel, or a micro light emitting diode (LED) display.

The operation acceptor 150 accepts an operation of a user using the terminal device 10. The operation acceptor 150 is configured of an input device such as a touch sensor. A method of detecting an input by a touch sensor may be a general detection method, such as, for example, a resistive film method, an infrared method, an electromagnetic induction method, or a capacitance method. Note that, the terminal device 10 may include a touch panel in which the displayer 140 and the operation acceptor 150 are integrally formed.

The storage 160 stores various programs necessary for an operation of the terminal device 10, and various pieces of data. The storage 160 is configured of a storage device such as, for example, a solid state drive (SSD) being a semiconductor memory, or a hard disk drive (HDD).

The storage 160 secures, as a storage area, a phone book data storage area 162, and also stores a control application 164.

The phone book data storage area 162 is an area, in the terminal device 10, that stores information (phone book data) used to contact and communicate with other users. Phone book data are generally information to be displayed or managed by a function called a phone book or an address book.

Phone book data include, for example, necessary information among the following information.

User Information

Information related to an individual user, such as a user name and a company name.

Destination Information

Information used when contacting a user, or transmitting information or data (e.g., image data or the like) to a user. Destination information is, for example, a phone number, a fax number, or an e-mail address.

Attribute Information

Information used to classify users and phone book data. Attribute information is, for example, information (information such as a group name, a folder name, and an ID for identifying a group) indicating a group to which a user belongs.

It is assumed that phone book data according to the present embodiment is information including user information and destination information among the above-described information. As illustrated in FIG. 3, phone book data according to the present embodiment store, for example, a user name (e.g., "Tanaka Ichiro") and its furigana (e.g., "tanaka ichiro"), the name of a company (e.g., "Company A") to which the user belongs, a phone number (e.g., "03-1111-2222") of the user, a fax (facsimile) number (e.g., "03-1111-2223") of the user, and an e-mail address (e.g., tanaka@a-sha.com) of the user.

Note that, phone book data may also store, in addition to the above-described information, information such as an address, a name of a department, and a memo, and attribute information (e.g., a group name, a tag name, a label name, or a favorite/non-favorite) for classifying and narrowing down phone book data. In addition, one piece of phone book data may store a plurality of pieces of destination information. In other words, the phone book data may be such data storing information to be generally stored as information used when contacting other users and the like in a terminal device such as a smartphone.

The control application 164 is an application that provides a function for controlling the controller 100 to communicate with the image processing apparatus 20, and select phone book data stored in the phone book data storage area 162 via the image processing apparatus 20. Processing to be performed by the control application 164 is described later.

The near field communicator 180 performs wireless communication with another device located in the vicinity of the terminal device 10. The near field communicator 180 is configured of, for example, a communication device including an antenna. A near field communication method used when the near field communicator 180 performs wireless communication may be any method, as far as the method is a generally used method. For example, as a near field communication method, the near field communicator 180 employs a method such as Bluetooth (registered trademark), near field communication (NFC), ZigBee (registered trademark), or a wireless USB.

The communicator 190 performs communication with an external device via a local area network (LAN) or a wide area network (WAN). The communicator 190 is configured of, for example, a network interface card (NIC) used in a wired/wireless LAN, or a communication module connectable to long term evolution (LTE)/LTE-Advanced (LTE-A)/license-assisted access using LTE (LAA)/5G lines.

1.2.2 Image Processing Apparatus

Figure 4:
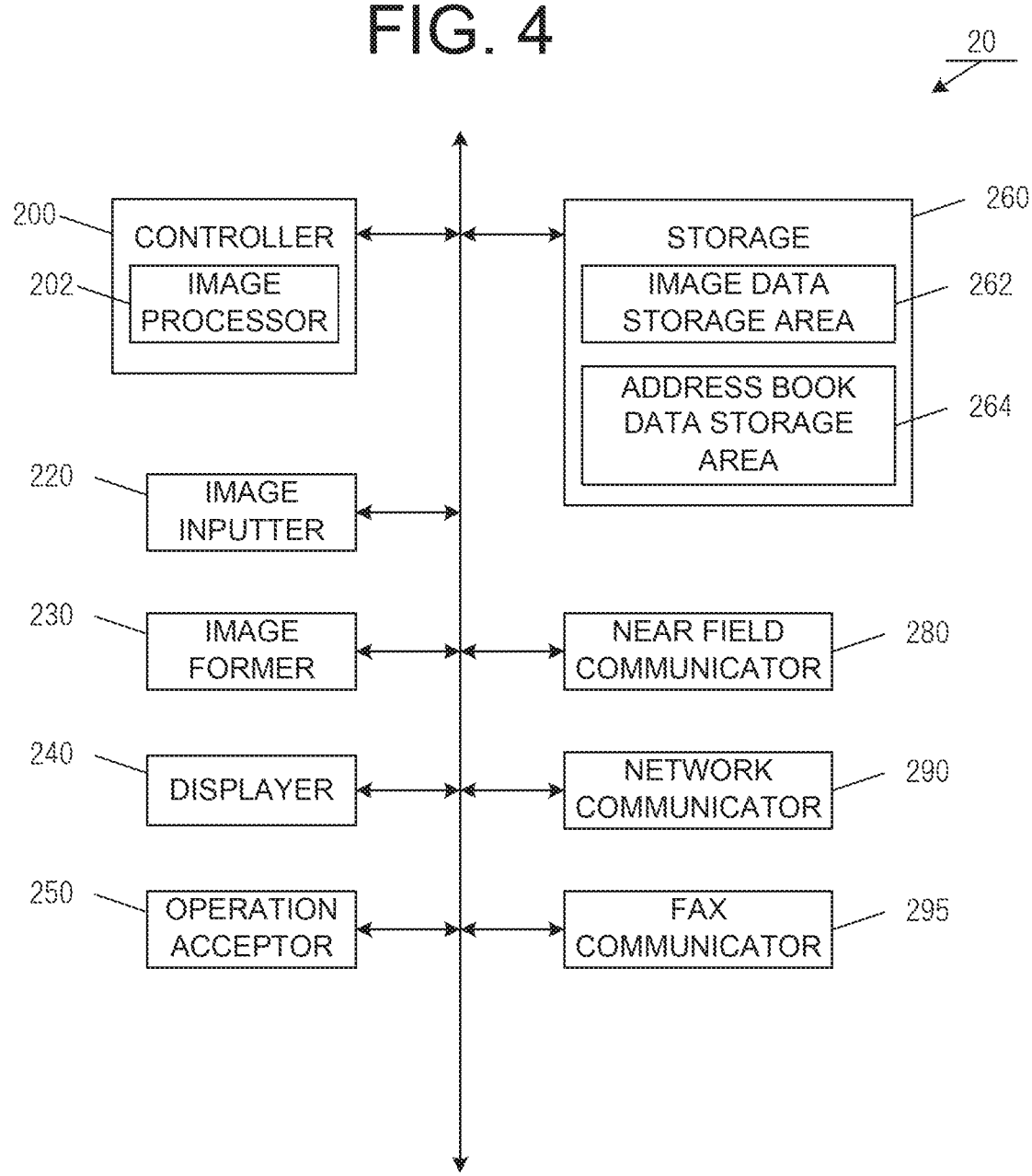
FIG. 4 is a diagram illustrating a functional configuration of an image processing apparatus according to the first embodiment.

A configuration of the image processing apparatus 20 according to the present embodiment is described with reference to FIG. 4. As illustrated in FIG. 4, the image processing apparatus 20 is configured to include a controller 200, an image inputter 220, an image former 230, a displayer 240, an operation acceptor 250, a storage 260, a near field communicator 280, a network communicator 290, and a fax communicator 295.

The controller 200 controls the entirety of the image processing apparatus 20. The controller 200 achieves various functions by reading and executing various programs stored in the storage 260, and is configured of one or more arithmetic devices (e.g., CPUs).

The image inputter 220 reads a document, and inputs data of a read image. For example, the image inputter 220 is configured of a scan device or the like including a device that converts optical information of a contact image sensor (CIS), a charge coupled device (CCD), or the like into electrical signals, and reads a document placed on a loading table of the image processing apparatus 20. Note that, the image inputter 220 may be configured of an interface (terminal) for reading an image stored in a universal serial bus (USB) memory.

The image former 230 forms (prints) an image on a recording medium such as recording paper. The image former 230 is configured of, for example, a laser printer or the like using an electrophotographic method.

The displayer 240 displays various pieces of information. The displayer 240 is configured of a display device such as, for example, an LCD, an organic EL panel, or a micro LED display.

The operation acceptor 250 accepts an operation of a user using the image processing apparatus 20. The operation acceptor 250 is configured of hardware keys (physical keys, a numeric keypad), and an input device such as a touch sensor. A method of detecting an input by a touch sensor may be a general detection method such as, for example, a resistive film method, an infrared method, an electromagnetic induction method, or a capacitance method. Note that, the image processing apparatus 20 may include a touch panel in which the displayer 240 and the operation acceptor 250 are integrally formed.

The storage 260 stores various programs necessary for an operation of the image processing apparatus 20, and various pieces of data. The storage 260 is configured of a storage device such as, for example, a SSD being a semiconductor memory, or an HDD.

The storage 260 secures, as a storage area, an image data storage area 262 and an address book data storage area 264.

The image data storage area 262 stores image data of an image input by the image inputter 220. Image data may be, for example, data (print data) representing an image to be formed by the image former 230, or a file in a format readable by another device.

The address book data storage area 264 stores information (address book data) related to a transmission destination (address) of image data. Note that, an address according to the present embodiment is information indicating a user, a device, a storage area of a device, or the like, to which image data are to be transmitted, and is information used by the image processing apparatus 20 for identifying a transmission destination of image data. As illustrated in FIG. 5, address book data according to the present embodiment store, for example, a user name (e.g., "Itou Saburo") and its furigana (e.g., "itou saburo"), a fax (facsimile) number (e.g., "03-2345-6789") of the user, an e-mail address (e.g., "itou@c-sha.com") of the user, and a memo (e.g., "sales department") related to the user.

Address book data may store a plurality of e-mail addresses and facsimile numbers. Address book data may also store, in addition to the above-described information, information such as an address, a company name, and a name of a department, and attribute information (e.g., a group name, a tag name, a label name, or a favorite/non-favorite) for classifying and narrowing down address book data. In other words, address book data may store, in an image processing apparatus having a function of transmitting image data, information to be generally stored as information on a transmission destination (address) of image data.

The near field communicator 280 performs wireless communication with another device located in the vicinity of the image processing apparatus 20. The near field communicator 280 is configured of, for example, a communication device including an antenna. A wireless communication method to be used by the near field communicator 280 may be any method, as far as the method is a wireless communication method to be generally used in near field communication such as, for example, Bluetooth, NFC, ZigBee, or a wireless USB.

The network communicator 290 performs communication with another device. For example, the network communicator 290 is configured of a communication device such as an NIC to be used in a wired/wireless LAN, or a communication module, and performs communication with an external device via a LAN or a WAN.

The fax communicator 295 is a functional part that transmits and receives an image to and from another device by being connected to a telephone line such as an analog line or a digital line (ISDN), and performing facsimile communication using a normal G3/G4 standard or the like, or performing facsimile communication using the Internet fax.

Facsimile communication is telecommunication that transmits and receives an image including characters, figures, and the like.

1.3 Flow of Processing

A flow of processing of the entirety of the system 1, and a flow of processing of the terminal device 10 and the image processing apparatus 20 according to the present embodiment are described with reference to FIGS. 6 to 9.

1.3.1 Flow of Processing of Entirety of System

Figure 6:
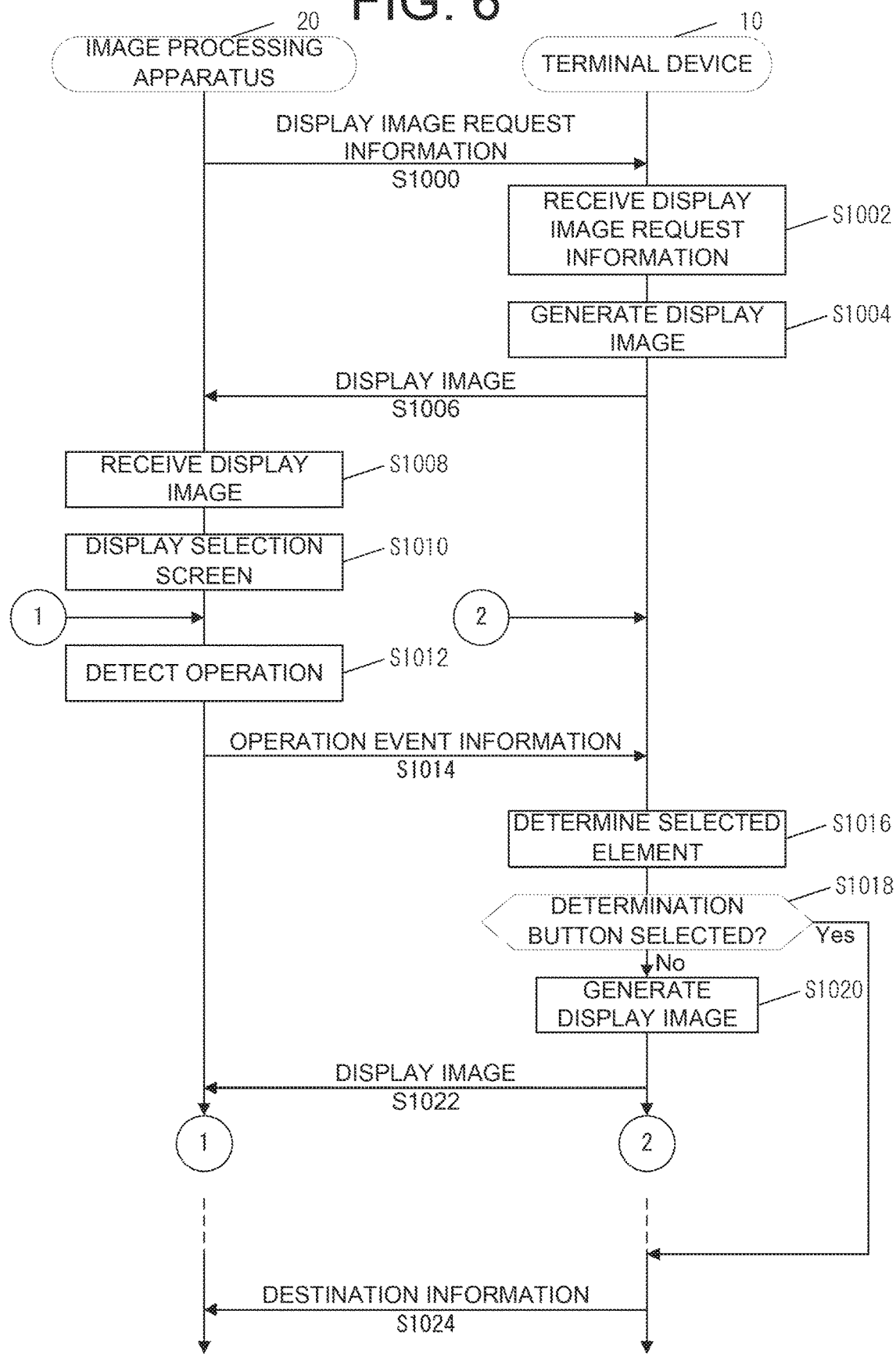
FIG. 6 is a sequence diagram illustrating a flow of processing according to the first embodiment.

Referring to FIG. 6, a flow of processing of the entirety of the system 1 according to the present embodiment is described. It is assumed that the terminal device 10 and the image processing apparatus 20 are in a communicable state in advance by pairing or an operation equivalent to pairing.

First, the image processing apparatus 20 transmits, to the terminal device 10, display image request information via the near field communicator 280 (S1000). Display image request information is information for requesting an image (display image) included in a screen (selection screen) for allowing a user to select a transmission destination (address) of image data acquired by the image processing apparatus 20. The selection screen includes elements such as a list and an item in which data based on phone book data stored in the phone book data storage area 162 are displayed, and a determination button for determining phone book data selected by the user.

The terminal device 10 receives display image request information transmitted from the image processing apparatus 20 via the near field communicator 180 (S1002). Subsequently, the terminal device 10 generates a display image (S1004), and transmits the generated display image to the image processing apparatus 20 via the near field communicator 180 (S1006). Note that a display image may be an image representing the entirety of a selection screen, or one or more images (partial images) to be arranged on a selection screen. In the present embodiment, it is assumed that a display image is an image representing the entirety of a selection screen. Therefore, in S1004, the terminal device reads phone book data acquired from the phone book data storage area 162, and generates a display image including a list containing destination information, a determination button, and other information.

The image processing apparatus 20 receives a display image transmitted from the terminal device 10 via the near field communicator 280 (S1008), and displays, on the displayer 240, a selection screen including the received display image (S1010).

Subsequently, the image processing apparatus 20 detects a user's operation input to the selection screen via the operation acceptor 250 (S1012), and transmits, to the terminal device 10, operation event information, which is information related to the operation, via the near field communicator 280 (S1014).

Operation event information includes, for example, the following information.

Information Indicating Operation

Information indicating an operation is information indicating a content of an operation input by the user, and, for example, information indicating a tap. Note that, information indicating an operation may include information indicating a gesture, such as multiple taps, swipe, flip, pinch-in, and pinch-out.

Information Indicating Position

Information indicating a position is information indicating a position (e.g., X and Y coordinates with the origin being set at an upper left corner of a display screen) on a display screen where an operation (e.g., a tap) has been performed by the user. Note that, information indicating a position may include information (e.g., a list of a plurality of coordinates) indicating a trajectory along which a tap operation has been performed, and information such as a moving speed (a speed of change of a tap position) of a finger.

Subsequently, when receiving operation event information via the near field communicator 180, the terminal device 10 determines an element selected by the user's operation from among elements included in the selection screen (S1016). For example, the terminal device 10 determines, from among display images on a selection screen and information indicating a position included in operation event information, an element (e.g., phone book data or a determination button) that is included in the display image on the selection screen, and is selected by the user.

Subsequently, the terminal device 10 determines, based on a determination in S1016, whether the determination button is selected by the user (S1018). When the terminal device 10 determines that the element selected by the user is not the determination button, the terminal device 10 generates again a display image on the selection screen, based on the element selected by the user (S1018; No→S1020). Furthermore, the terminal device 10 transmits, to the image processing apparatus 20, the display image on the selection screen generated in S1020 via the near field communicator 180 (S1022).

Thereafter, the image processing apparatus 20 performs processing from S1012, and the terminal device 10 performs processing from S1016. This allows the image processing apparatus 20 and the terminal device 10 to update a selection screen to be displayed on the displayer 240 of the image processing apparatus 20, based on an operation performed by the user until the determination button is selected by the user.

On the other hand, in Step S1018, when the terminal device 10 determines that the element selected by the user is the determination button, the terminal device 10 transmits destination information to the image processing apparatus 20 via the near field communicator 180 (S1018; Yes→S1024).

Note that, the terminal device 10 transmits, to the image processing apparatus 20, a fax number or an e-mail address, as destination information. At this occasion, the terminal device 10 may transmit, to the image processing apparatus 20, only information of a necessary type (e.g., a fax number) among destination information. For example, when the controller 100 is notified that a function to be performed by the image processing apparatus 20 is a function (scan to e-mail function) of transmitting image data read by a scan device, the controller 100 transmits only an e-mail address to the image processing apparatus 20. Also, when the controller 100 is notified that a function to be performed by the image processing apparatus 20 is a facsimile transmission function, the controller 100 transmits only a fax number to the image processing apparatus 20.

1.3.2 Image Processing Apparatus

Figure 7:
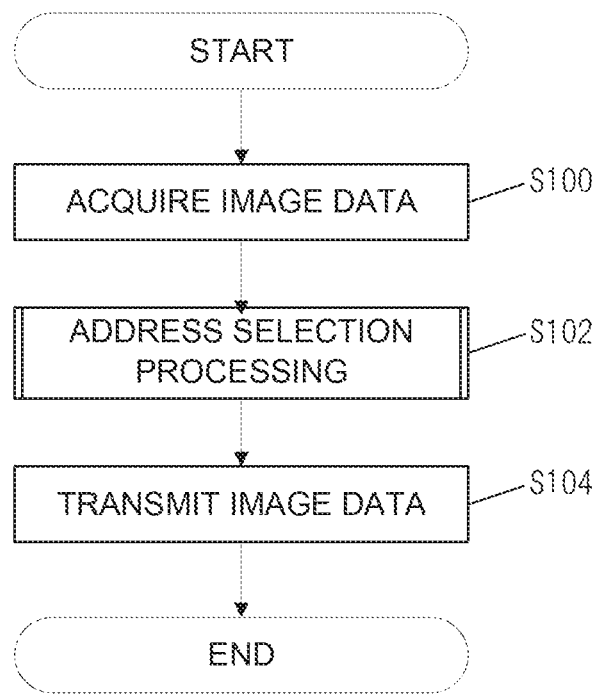
FIG. 7 is a flowchart illustrating a flow of processing of the image processing apparatus according to the first embodiment.
Figure 8:
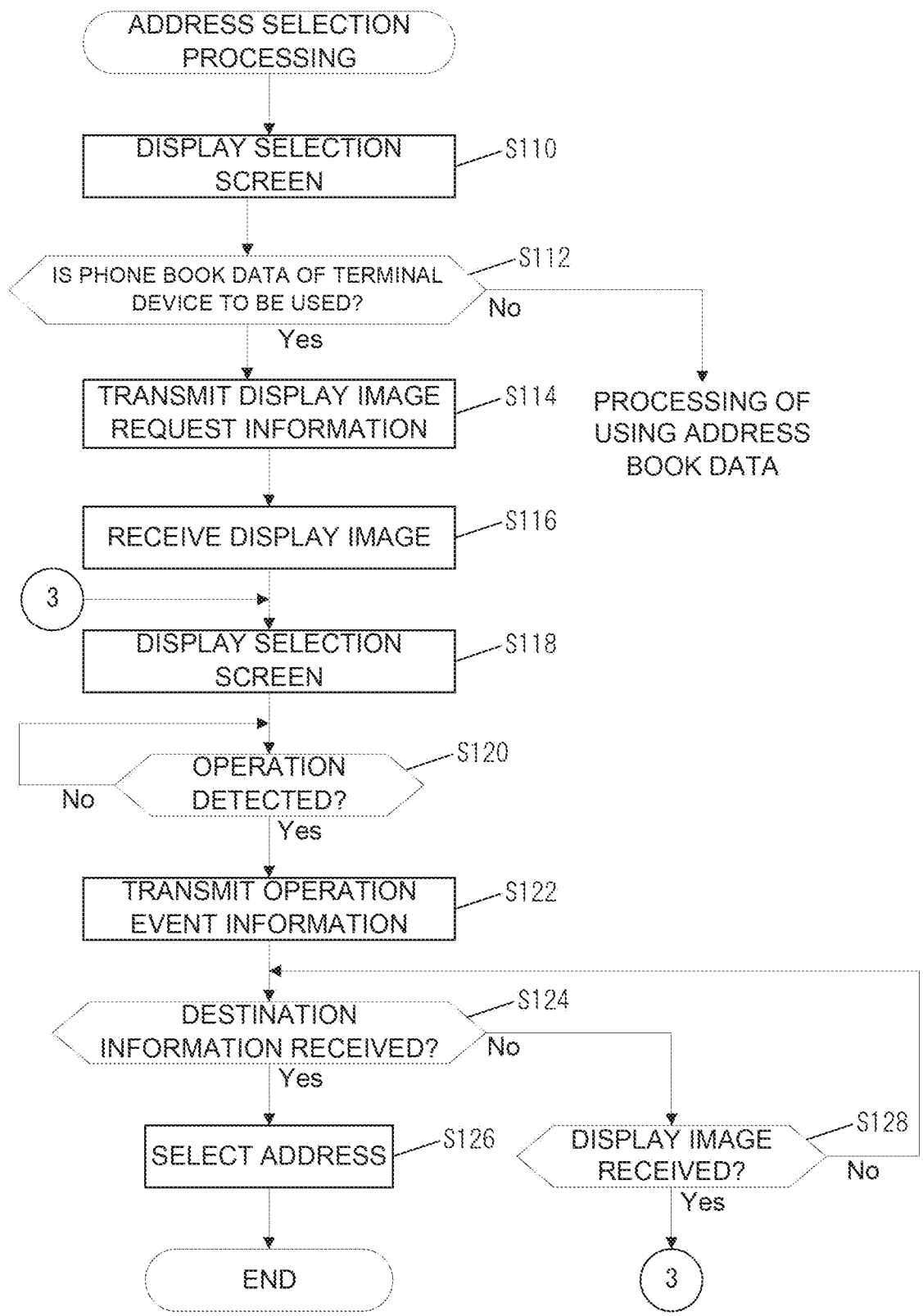
FIG. 8 is a flowchart illustrating a flow of address selection processing according to the first embodiment.

A flow of processing to be performed by the image processing apparatus 20 is described with reference to FIGS. 7 and 8. Processing in FIGS. 7 and 8 is performed by causing the controller 200 to read a program stored in the storage 260, and is specifically performed, when execution of a job of transmitting image data to another device is instructed.

First, the controller 200 acquires image data of an image (image for transmission) to be transmitted to another device (Step S100). For example, the controller 200 reads a document placed on the image processing apparatus 20, and acquires image data of the document by controlling the image inputter 220. Note that, the controller 200 may store acquired image data of the image in the image data storage area 262.

Subsequently, the controller 200 performs address selection processing, which is processing for selecting a transmission destination (destination) of image data acquired in Step S100 (S102). Processing in address selection processing is described with reference to FIG. 8.

First, the controller 200 displays a selection screen on the displayer 240 (Step S110). A selection screen to be displayed in Step S110 is a screen for selecting a transmission destination (address) of image data acquired in Step S100, and is a screen for displaying or selecting address book data stored in the address book data storage area 264. For example, the controller 200 reads address book data from the address book data storage area 264, and displays, on the displayer 240, a screen including a list from which an item in which a user name, an e-mail address, and the like stored in the address book data are displayed is selectable. The controller 200 may also include, on a selection screen, a button that accepts an operation for using phone book data stored in the terminal device 10.

Subsequently, the controller 200 determines whether to use phone book data stored in the terminal device 10 (Step S112). For example, when an operation for selecting a button that accepts an operation for using phone book data, which is displayed in Step S110, is performed, the controller 200 determines to use the phone book data.

When the controller 200 determines that phone book data are used, the controller 200 transmits, to the terminal device 10, display image request information via the near field communicator 280 (Step S112; Yes→Step S114). Also, the controller 200 receives, from the terminal device 10, a display image via the near field communicator 280 (Step S116), and displays, on the displayer 240, a selection screen including the display image (Step S118).

Subsequently, the controller 200 determines whether a user's operation for the selection screen is detected via the operation acceptor 250 (Step S120). When detecting the operation, the controller 200 transmits, to the terminal device 10, operation event information, which is information indicating an operation input to the selection screen, via the near field communicator 280 (Step S120; Yes→Step S122). For example, the controller 200 acquires information such as a position on a display screen selected (tapped) by the user, a type of gesture (e.g., swipe and the like), and a speed of change of a touched position, and transits, to the terminal device 10, operation event information constituted of the acquired information.

Subsequently, the controller 200 determines whether destination information (e.g., a fax number or an e-mail address) is received from the terminal device 10 via the near field communicator 280 (Step S124). When receiving destination information, the controller 200 selects a transmission destination (address) of image data, based on the destination information (Step S124; Yes→Step S126). For example, when transmitting image data acquired in Step S100 to a transmission destination by using facsimile communication, the controller 200 selects a fax number, as the address. In addition, when transmitting image data acquired in Step S100 to a transmission destination by attaching the image data to an e-mail, the controller 200 selects an e-mail address as the address. In this way, the controller 200 can receive, from the terminal device 10, destination information indicating an address of an image for transmission, based on an operation input to a selection screen including a display image.

On the other hand, when the controller 200 does not receive destination information in Step S124, the controller 200 determines whether a display image has been received from the terminal device 10 via the near field communicator 280 (Step S124; No→Step S128). When the controller 200 has received a display image, processing returns to Step S118, and the controller 200 displays, on the displayer 240, a selection screen including the display image received in Step S128 (Step S128; Yes→Step S118). On the other hand, when the controller 200 does not receive a display image in Step S128, processing returns to Step S124 (Step S128; No→Step S124).

Referring back to FIG. 7, the controller 200 transmits, to the address selected in Step S102, image data of an image for transmission acquired in Step S100 (Step S104). For example, when transmitting image data by attaching the image data to an e-mail, the controller 200 generates an e-mail attached with image data acquired in Step S100 by setting the e-mail address selected in Step S102, as a destination. Then, the controller 200 transmits, to a predetermined mail server, the generated e-mail via the network communicator 290. In addition, when transmitting image data by using facsimile communication, the controller 200 transmits image data acquired in Step S100 via the fax communicator 295 by setting the fax number selected in Step S102, as a destination.

Note that, in Step S112, when determining that phone book data stored in the terminal device 10 are not used, the controller 200 performs processing of using address book data stored in the image processing apparatus 20 (Step S112; No). For example, the controller 200 allows the user to select address book data stored in the address book data storage area 264 of the image processing apparatus 20, and determines, as a transmission destination of image data, a fax number or an e-mail address stored in the selected address book data. Then, the controller 200 transmits the image data by setting the determined fax number or e-mail address, as a destination.

1.3.3 Terminal Device

Figure 9:
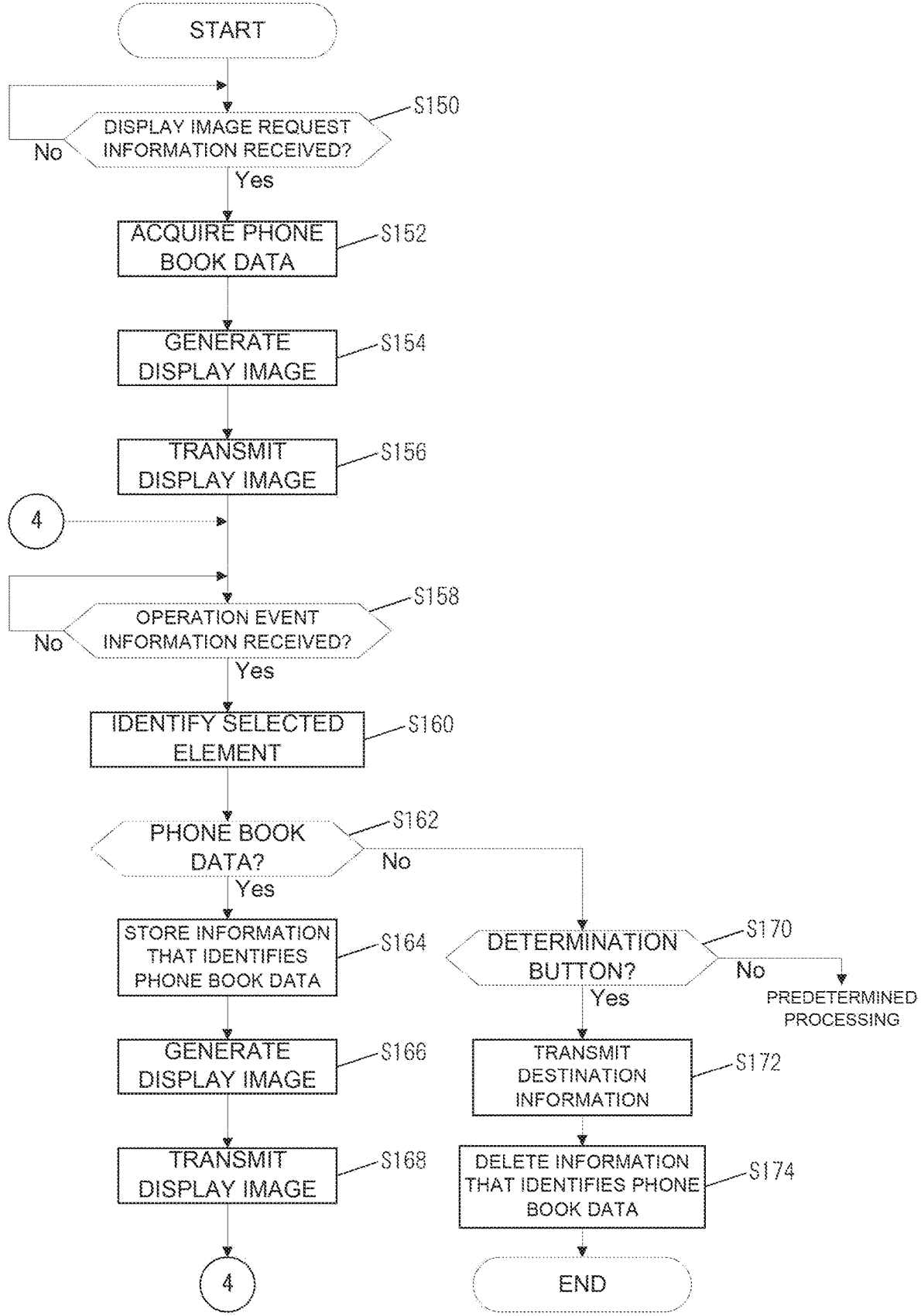
FIG. 9 is a flowchart illustrating a flow of processing of the terminal device according to the first embodiment.

Next, a flow of processing to be performed by the terminal device 10 is described with reference to FIG. 9. Processing illustrated in FIG. 9 is performed by causing the controller 100 to read the control application 164 stored in the storage 160, and being controlled by the control application 164. Note that, when performing the processing illustrated in FIG. 9, the controller 100 may perform background processing without displaying a predetermined screen on the displayer 140.

First, the controller 100 determines whether display image request information has been received from the image processing apparatus 20 via the near field communicator 180 (Step S150). When the controller 100 does not receive display image request information, the controller 100 repeats processing in Step S150 (Step S150; No).

On the other hand, when receiving display image request information, the controller 100 acquires phone book data from the phone book data storage area 162 (Step S150; Yes→Step S152), and generates a display image based on the phone book data (Step S154). In the present embodiment, the controller 100 generates, as a display image, an image representing the entirety of a selection screen (an image indicating a selection screen).

For example, the controller 100 performs the following processing in Step S154.

(1) The controller 100 newly generates image data of a size displayable on the displayer 240 of the image processing apparatus 20.

(2) The controller 100 reads a predetermined number of pieces of phone book data from the phone book data storage area 162.

(3) The controller 100 edits image data generated in (1), and when the image data are displayed on the displayer 240 of the image processing apparatus 20, the controller 100 displays an element constituting a selection screen.

Herein, elements constituting a selection screen are, for example, the following elements.

Information stored in read phone book data (e.g., a user name, a fax number)

Button for switching information on phone book data to be displayed

Determination button

For example, the controller 100 edits (processes) image data in such a way that information on phone book data (e.g., a user name, and a fax number being destination information) is displayed as an item in a list included in a selection screen.

Subsequently, the controller 100 transmits, to the image processing apparatus 20, a display image generated in Step S154 via the near field communicator 180 (Step S156). Also, the controller 100 determines, via the near field communicator 180, whether operation event information has been received from the image processing apparatus 20 (Step S158).

Subsequently, when receiving operation event information, the controller 100 identifies an element selected by the user, based on the operation event information (Step S160). For example, when a position on a display screen included in operation event information lies within an area (e.g., one item in a list) where information on one piece of phone book data displayed on the selection screen is displayed, the controller 100 identifies that the selected element is the phone book data. Likewise, when a position on a display screen included in operation event information lies within an area where a determination button is displayed, the controller 100 identifies that the selected element is the determination button.

Subsequently, the controller 100 determines whether the element identified in Step S160 is phone book data (Step S162).

When the identified element is phone book data, the controller 100 determines one piece of phone book data selected by the user, and temporarily stores information that identifies the determined phone book data in the storage 160 (Step S162; Yes→Step S164). For example, the controller 100 stores, in a temporary storage area different from the phone book data storage area 162, one piece of phone book data associated with an element identified in Step S160. Note that, the controller 100 may attach in advance identification information such as an ID to phone book data stored in the phone book data storage area 162, and in Step S164, temporarily store, in the storage 160, the identification information as information that identifies phone book data.

Subsequently, the controller 100 generates again a display image (image on a selection screen) (Step S166), and transmits the display image to the image processing apparatus 20 via the near field communicator 180 (Step S168). For example, in Step S166, the controller 100 generates image data in which a background color of a rectangular area including information (e.g., a user name, fax number) associated with temporarily stored phone book data is changed, or information associated with the phone book data is displayed in a highlighted manner. By causing the image processing apparatus 20 to display a selection screen including a display image as described above, phone book data selected by the user are displayed on the displayer 240 in a highlighted manner.

After the controller 100 performs processing of Step S168, processing returns to Step S158. In this way, each time when phone book data are selected from a selection screen by the user, the controller 100 stores information that identifies the selected phone book data. Thus, the controller 100 allows the user to select from a plurality of pieces of phone book data.

On the other hand, when an element identified in Step S160 is not phone book data, the controller 100 determines whether the identified element is the determination button (Step S162; Yes→Step S170).

When the identified element is the determination button, the controller 100 can recognize that selection of phone book data has been completed in the image processing apparatus 20. Therefore, the controller 100 transmits, to the image processing apparatus 20, only destination information selected by the user, i.e., only information that is needed to transmit image data by the image processing apparatus 20 via the near field communicator 180 (Step S170; Yes→Step S172).

For example, the controller 100 performs the following processing.

(1) The controller 100 identifies phone book data, based on information that identifies temporarily stored phone book data in Step S164.

(2) The controller 100 acquires destination information (a fax number or an e-mail address) stored in identified phone book data.

(3) The controller 100 generates destination information constituted of the acquired fax number or e-mail address, and transmits the information to the image processing apparatus 20.

By performing the above-described processing, the controller 100 can transmit, to the image processing apparatus 20, only destination information included in phone book data selected by the user via a selection screen.

Subsequently, the controller 100 deletes information that identifies phone book data temporarily stored in Step S164 (Step S174). Also at this point of time, the controller 100 terminates communication with the image processing apparatus 20.

Note that, in Step S170, when an element identified in Step S160 is not a determination button, the controller 100 performs predetermined processing (Step S170; No). For example, when an element identified in Step S160 is a button for switching information on phone book data to be displayed on a selection screen, the controller 100 performs similar processing to that of Step S154 after changing phone book data to be read, and generates a display image. In addition, the controller 100 transmits the generated display image to the image processing apparatus 20 via the near field communicator 180.

Note that, the controller 100 may perform processing associated with a predetermined operation, based on operation event information received in Step S158. For example, when the controller 100 receives operation event information indicating that a swipe operation has been performed by the user, the controller 100 may generate a display image similarly to processing in which a button for switching information on phone book data is selected, and transmit the display image to the image processing apparatus 20.

In addition, when generating a selection screen including phone book data associated with phone book data stored in Step S164, specifically, phone book data that have already been selected by the user, the controller 100 may display the selected phone book data in a highlighted manner. Also, when an element identified in Step S160 is phone book data that have already been selected, the controller 100 may perform processing of deleting information that identifies the selected phone book data from information that identifies temporarily stored phone book data. By generating a display image in this state, the controller 100 can transmit a display image in which selection of phone book data selected by the user is cancelled.

1.4 Operation Example

Figure 10A:
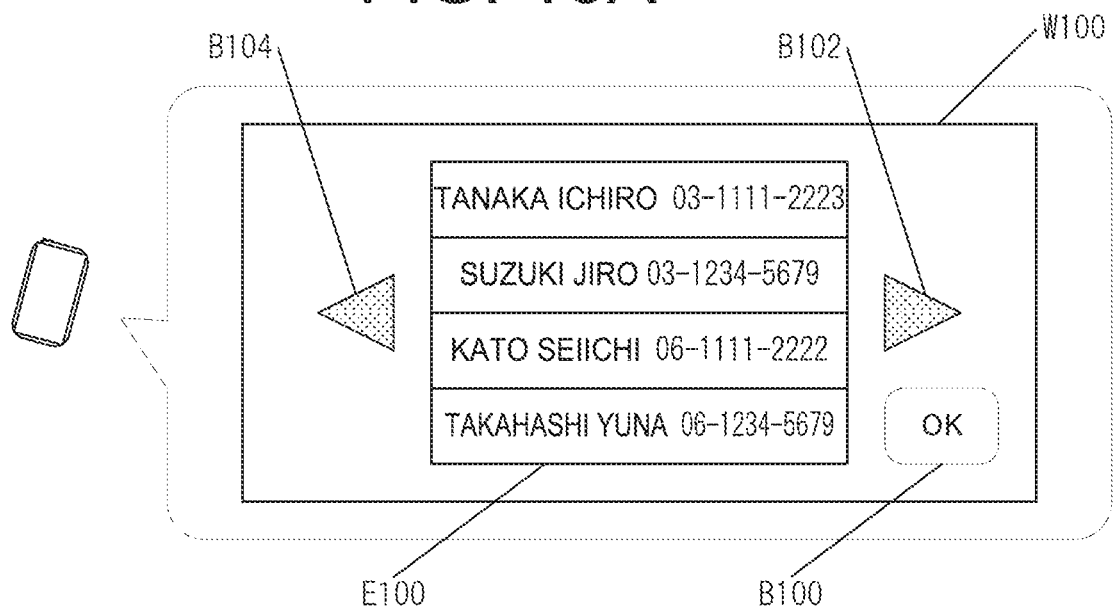
FIGS. 10A and 10B are diagrams illustrating an operation example according to the first embodiment.

Next, an operation example according to the present embodiment is described with reference to FIGS. 10A to 11B. FIG. 10A is a diagram illustrating a display image to be generated by the terminal device 10. The terminal device 10 generates an image of a selection screen W100, based on phone book data. The selection screen W100 includes, for example, a list E100 from which an item associated with each piece of phone book data is selectable, and a determination button B100. Herein, information to be displayed in an item included in the list E100 is, for example, a user name and destination information (e.g., a facsimile number). Also, the list E100 includes a plurality of pieces of destination information.

In addition, the selection screen W100 may include a button (e.g., a forward button B102 and a return button B104) for switching an item to be displayed in the list E100. Furthermore, the selection screen W100 may include an element other than the buttons and the list described above.

Figure 10B:
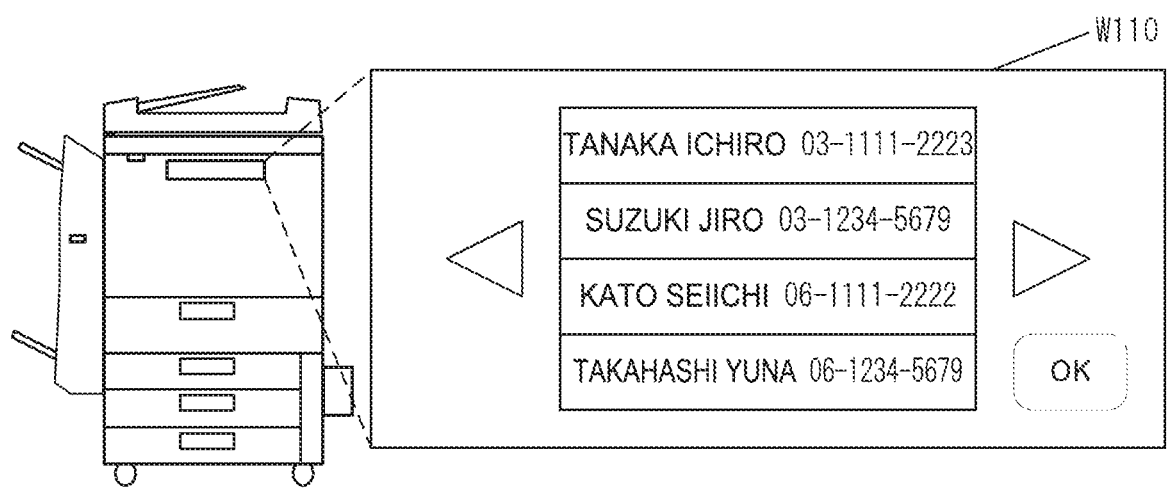

FIG. 10B is a diagram illustrating a display screen W110 to be displayed on the displayer 240 of the image processing apparatus 20. The display screen W110 is a screen on which an image of the selection screen W100 generated by the terminal device 10 is displayed as it is. In this way, the image processing apparatus 20 displays, on the displayer 240, a display image received from the terminal device 10 as it is.

Figure 11A:
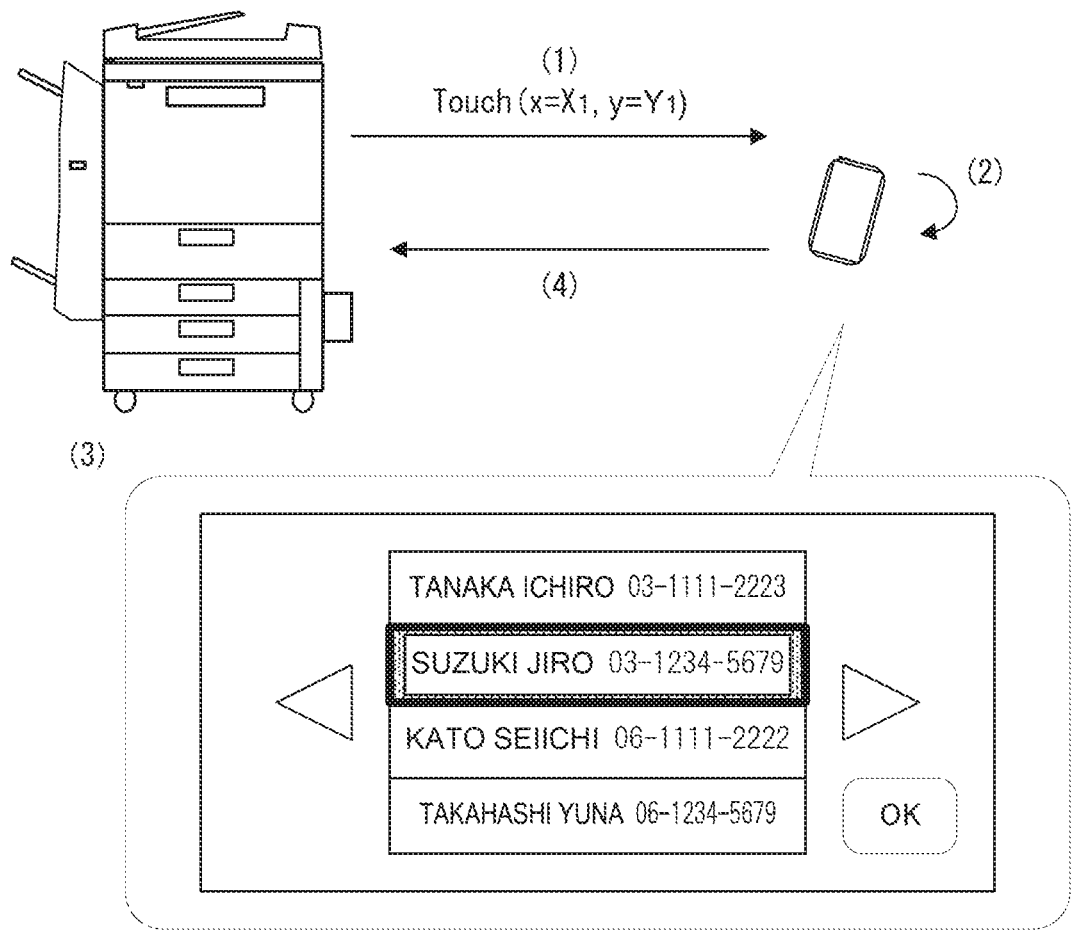
FIGS. 11A and 11B are diagrams illustrating an operation example according to the first embodiment.
Figure 11B:
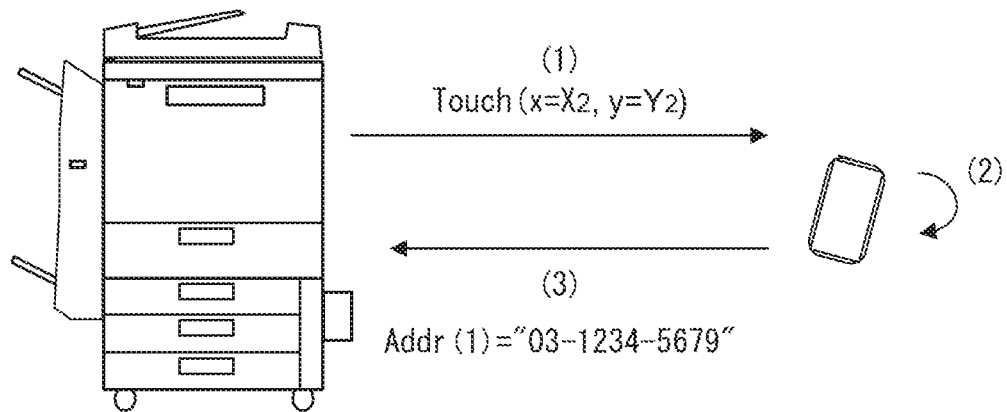

Next, referring to FIGS. 11A and 11B, an operation example is described in which a user operates the image processing apparatus 20 in a case where a selection screen is displayed on the image processing apparatus 20. FIG. 11A is a diagram illustrating a case where a user taps a position (X coordinate position: X1, Y coordinate position: Y1) at which information on phone book data is displayed.

In this case, the terminal device 10 and the image processing apparatus 20 communicate with each other, and perform processing as follows.

(1) The image processing apparatus 20 transmits, to the terminal device 10, information indicating that a tap position is (x=X1, y=Y1), as operation event information.

(2) The terminal device 10 identifies that phone book data have been selected.

(3) The terminal device 10 generates an image in which the selected phone book data are highlighted.

(4) The terminal device 10 transmits the generated image to the image processing apparatus 20.

As illustrated in FIG. 11A, the displayer 240 of the image processing apparatus 20 displays a selection screen for selecting phone book data stored in the terminal device 10. However, when a selection screen is displayed, information to be transmitted from the terminal device 10 to the image processing apparatus 20 is not phone book data, but a display image representing the entirety of a selection screen. Therefore, at this point of time, phone book data themselves stored in the terminal device 10 are not transmitted to the image processing apparatus 20.

By displaying an image received from the terminal device 10 on the displayer 240, the image processing apparatus 20 displays an image (selection screen) illustrated in (3) of FIG. 11A.

FIG. 11B is a diagram illustrating a case in which the user taps a position (X coordinate position: X2, Y coordinate position: Y2) at which the determination button is displayed. In this case, the terminal device 10 and the image processing apparatus 20 communicate with each other, and perform processing as follows.

(1) The image processing apparatus 20 transmits, to the terminal device 10, information indicating that a tap position is (x=X2, y=Y2), as operation event information.

(2) The terminal device 10 identifies that the determination button has been selected.

(3) The terminal device 10 transmits destination information to the image processing apparatus 20.

As illustrated in FIG. 11B, when the determination button is selected on the image processing apparatus 20, a part of phone book data (e.g., only a fax number) stored in the terminal device 10 is transmitted.

Thus, the image processing apparatus according to the present embodiment minimizes information to be received, even in use of phone book data stored in a terminal device such as a smartphone, when image data are transmitted by being attached to an e-mail or transmitted by facsimile communication. In particular, a selection screen of phone book data to be selected as a transmission destination of image data is generated as an image on the terminal device side, and transmitted to the image processing apparatus. Therefore, the image processing apparatus can display a selection screen regarding a transmission destination of image data simply by displaying an image received from the terminal device.

As described above, since the image processing apparatus according to the present embodiment displays a selection screen without causing the terminal device to transmit phone book data (destination information), it becomes possible to remove a psychological barrier from the user in transferring destination information.

Further, the image processing apparatus displays a display image that is generated and transmitted by the terminal device, and transmits, to the terminal device, operation event information indicating an operation (e.g., tap, swipe, and the like) on a selection screen thereof. The image processing apparatus can update an operation screen by receiving and displaying a display image representing a selection screen generated by the terminal device in response to an operation. In this way, since the image processing apparatus according to the present embodiment allows the user to select phone book data by a general operation, user's convenience can be secured.

2. Second Embodiment

Next, a second embodiment is described. The second embodiment is an embodiment in which a display image is an image (partial image) associated with an element included in a selection screen. The present embodiment is an embodiment in which FIG. 8 in the first embodiment is replaced with FIG. 12, and FIG. 9 in the first embodiment is replaced with FIG. 14, respectively. Note that, same processing is indicated with a same reference sign, and description thereof is omitted.

2.1 Flow of Processing 2.1.1 Image Processing Apparatus

A flow of processing of an image processing apparatus 20 according to the present embodiment is described. In the present embodiment, the image processing apparatus 20 performs processing illustrated in FIG. 12, as address selection processing.

In the present embodiment, after transmitting display image request information, a controller 200 receives, from a terminal device 10, structure data constituted of an image and information (e.g., an image name) for identifying the image via a near field communicator 280 (Step S210). Information that identifies an image may be information such as an image ID or a sequential number. However, in the present embodiment, description is made based on a premise that information that identifies an image is an image name.

Figure 13:
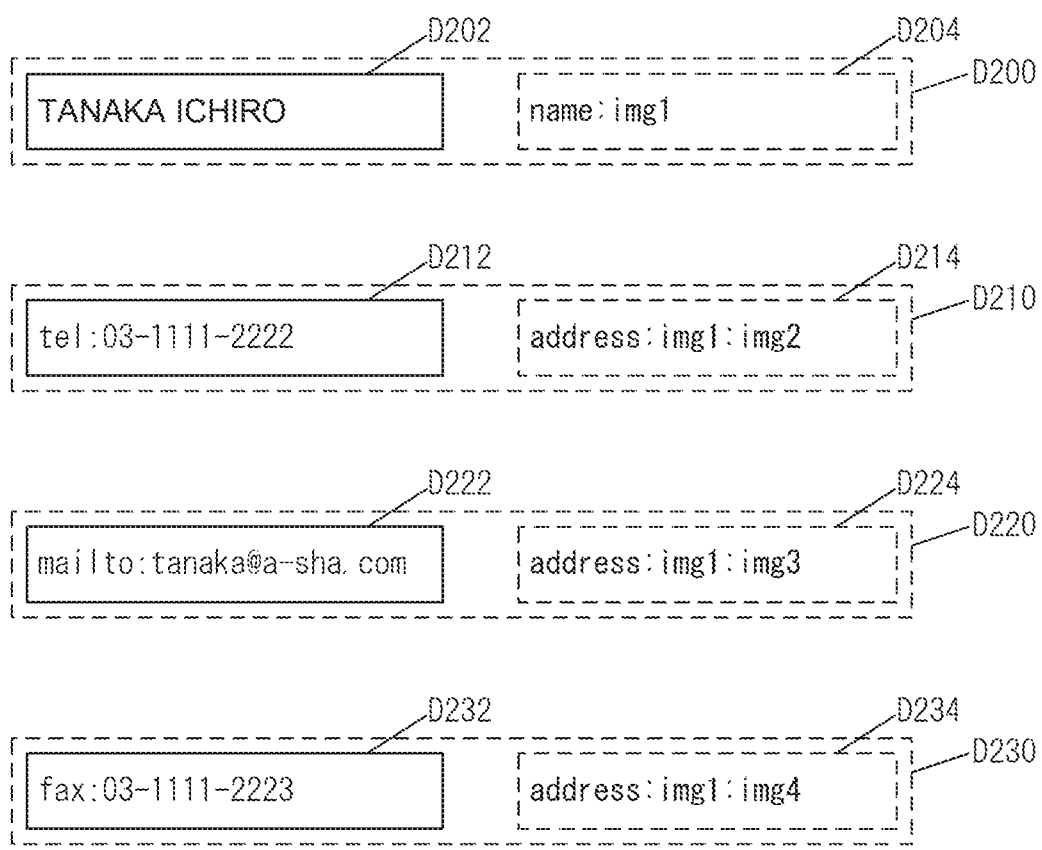
FIG. 13 is a flowchart illustrating structure data according to the second embodiment.

An example of structure data to be received in Step S210 is illustrated in FIG. 13. As illustrated in FIG. 13, structure data are data including one or more pieces of data in which an image and an image name are associated with each other. An image included in structure data is a display image indicating information stored in phone book data. In other words, a display image according to the present embodiment is an image (e.g., an image representing a fax number or an e-mail address) indicating destination information, and an image (e.g., an image representing a user name) indicating information associated with the destination information.

Further, the structure data include, for example, data D200 in which an image D202 indicating a user's name, and an image name D204 (e.g., "name:img1") of the image D202 are associated with each other. Likewise, the structure data includes data D210 in which an image D212 indicating a phone number, and an image name D214 (e.g., "address: img1:img2") are associated with each other, data D220 in which an image D222 indicating an e-mail address, and an image name D224 (e.g., "address:img1:img3") are associated with each other, and data D230 in which an image D232 indicating a fax number, and an image name D234 (e.g., "address:img1:img4") are associated with each other. Note that, the structure data may include data other than the data illustrated in FIG. 13.

Subsequently, the controller 200 displays a selection screen on a displayer 240 (Step S212). For example, the controller 200 generates (configures) a selection screen including a display image received in Step S210, buttons that switch a display content of the selection screen, and the like, and on which the display image, the buttons, and the like are arranged at a predetermined position, and displays the generated screen on the displayer 240.

Subsequently, when the controller 200 detects a user's operation (e.g., a tap operation for the displayer 240), the controller 200 determines whether the operation is an operation for a display image received from the terminal device 10 (Step S120; Yes→Step S214). The display image received from the terminal device 10 is, as described above, a display image included in structure data received in Step S210, and is an image associated with an image name.

When determining that a user's operation is an operation for a display image, the controller 200 transmits, to the terminal device 10, an image name associated with the display image via the near field communicator 280 (Step S214; Yes→Step S216).

Subsequently, the controller 200 determines whether destination information has been received from the terminal device 10 via the near field communicator 280 (Step S218). When receiving destination information, the controller 200 selects a transmission destination (address) of image data, based on the received destination information (Step S218; Yes→Step S220). Also, the controller 200 transmits, to the terminal device 10, selection completion information indicating that selection of phone book data has been completed via the near field communicator 280 (Step S222).

On the other hand, in Step S214, when the controller 200 determines that a detected operation is not an operation for a display image, processing returns to Step S120 (Step S214; No→Step S120). An operation other than the operation for a display image is, for example, an operation of selecting a button that switches a display content of a selection screen. Note that, before processing returns to Step S120, the controller 200 may transmit, to the terminal device 10, a request for structure data again, and may receive the structure data from the terminal device 10. In this case, the controller 200 may request structure data related to other information included in currently displayed phone book data, or may request structure data of phone book data different from currently displayed phone book data. Further, the controller 200 displays, on the displayer 240, a selection screen configured based on structure data received from the terminal device 10. This allows the controller 200 to switch a display content of a selection screen.

Further, when the controller 200 determines that no destination information has been received in Step S218 (e.g., when receiving user name information or the like), processing returns to Step S120 (Step S218; No→Step S120). Note that, when receiving information other than destination information from the terminal device 10, the controller 200 may transmit, to the terminal device 10, a request for structure data related to the received information, and receive the structure data from the terminal device 10. For example, when receiving user name information from the terminal device 10, the controller 200 may request the terminal device 10 for structure data including an image indicating address information of the user.

In the foregoing description, when the controller 200 of the image processing apparatus 20 receives destination information from the terminal device 10, the controller 200 selects an address based on the destination information, and transmits selection completion information to the terminal device 10. However, processing as described above may not have to be performed. For example, in Step S212, as in the case of the first embodiment, the controller 200 may include a determination button in a selection screen. In this case, the controller 200 repeats processing from Step S120 to Step S220 in FIG. 12 until the determination button is selected. In this way, the controller 200 can receive one or more pieces of destination information from the terminal device 10 until the determination button is selected, and when the determination button is selected, the controller 200 can select one or more addresses based on the destination information received from the terminal device 10. Note that, a controller 100 may identify and display an image selected by the user by changing a background color or displaying a frame border. Thus, the controller 200 allows the user to visually recognize currently selected information.

2.1.2 Terminal Device

A flow of processing of the terminal device 10 according to the present embodiment is described. In the present embodiment, by causing the controller 100 to be controlled by a control application 164, the terminal device 10 performs processing illustrated in FIG. 14.

In the present embodiment, after acquiring phone book data in Step S152, the controller 100 generates a display image based on the phone book data (Step S250). A display image based on phone book data is, for example, an image indicating a user name, an image indicating an e-mail address, or the like, as illustrated in FIG. 13.

Subsequently, the controller 100 determines an image name for the display image generated in Step S250, and generates structure data constituted of the display image and the image name as illustrated in FIG. 13. Then, the controller 100 transmits the structure data to the image processing apparatus 20 via a near field communicator 180 (Step S252).

Subsequently, the controller 100 determines whether an image name has been received from the image processing apparatus 20 via the near field communicator 180 (Step S254). When determining that an image name has been received, the controller 100 transmits, to the image processing apparatus 20, destination information associated with the image name via the near field communicator 180 (Step S254; Yes→Step S256). At this occasion, information to be transmitted to the image processing apparatus 20 by the controller 100 is, for example, a user name, a phone number of the user, an e-mail address of the user, a fax number of the user, and the like.

Note that, when determining that an image name has not been received in Step S254, the controller 100 omits (skips) processing in Step S256 (Step S254; No).

Subsequently, the controller 100 determines, via the near field communicator 180, whether selection completion information has been received from the image processing apparatus 20 (Step S258). When determining that selection completion information has been received, the controller 100 terminates the processing illustrated in FIG. 14 (Step S258; Yes). Note that, at this point of time, the terminal device 10 terminates communication with the image processing apparatus 20. On the other hand, when the controller 100 determines that selection completion information has not been received in Step S258, processing returns to Step S254 (Step S258; No→Step S254).

Note that, in addition to the above-described processing, when receiving a request for structure data from the image processing apparatus 20 via the near field communicator 180, the controller 100 may generate structure data, based on the request. In this case, the controller 100 transmits the generated structure data to the image processing apparatus 20 via the near field communicator 180.

2.2 Operation Example

Figure 15A:
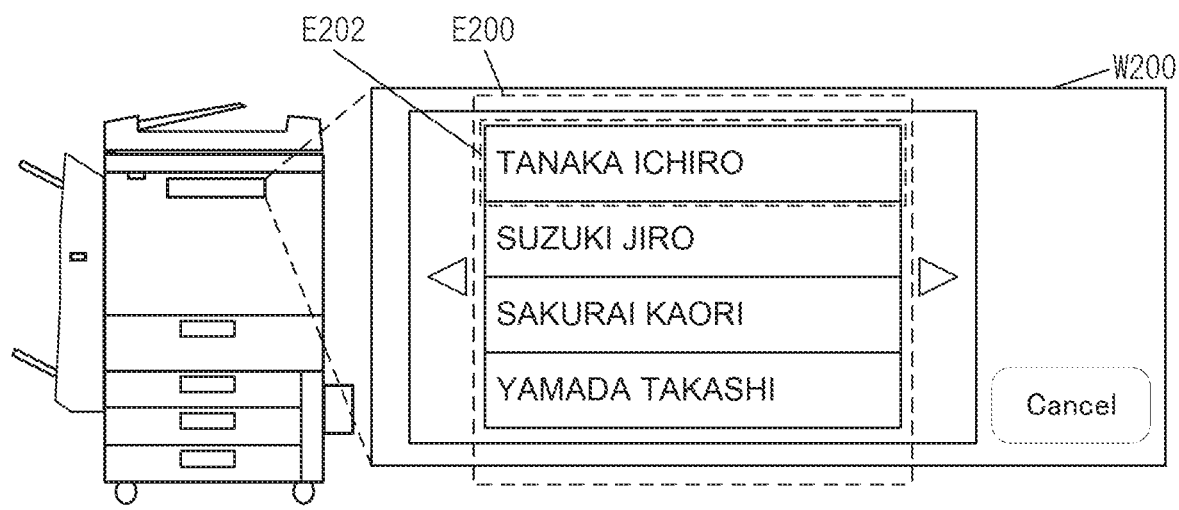
FIGS. 15A and 15B are diagrams illustrating an operation example according to the second embodiment.

An operation example according to the present embodiment is described with reference to FIGS. 15A and 15B. FIG. 15A is a diagram illustrating a selection screen W200 to be displayed on the displayer 240 of the image processing apparatus 20, when four images indicating user names are received from the terminal device 10. The selection screen W200 includes an area E200 in which four images are arranged. The user can select one image from among the images included in the area E200.

Figure 15B:
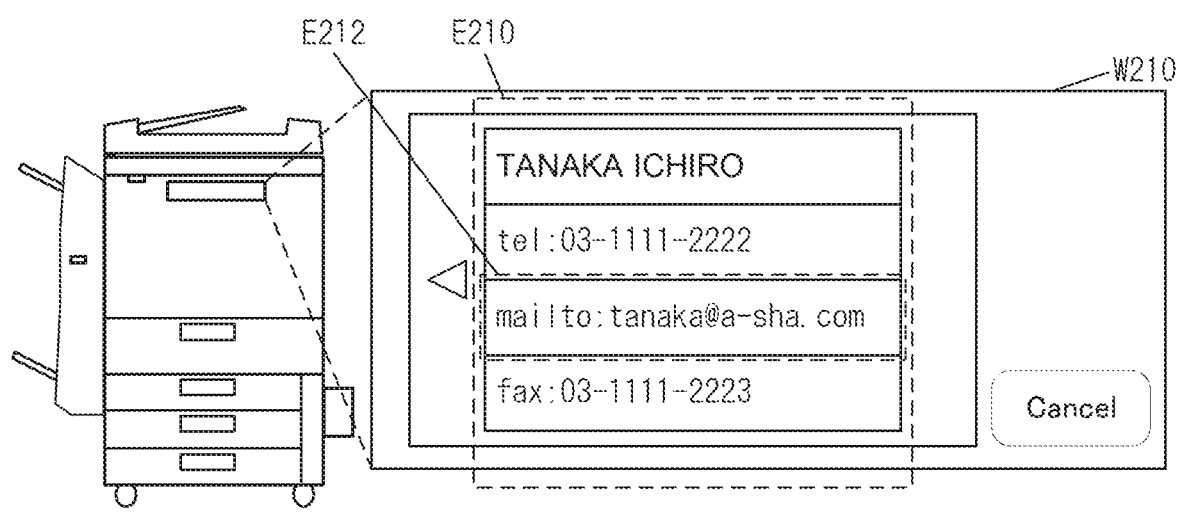

FIG. 15B is a diagram illustrating a selection screen W210 to be displayed, when an image E202 is selected from the selection screen W200 illustrated in FIG. 15A. The selection screen W210 includes an area E210 in which an image indicating information stored in phone book data of one user selected by the user on the selection screen W200.

The user can further select one image from the area E210. For example, the user can select, from the area E210, an image E212 indicating an e-mail address. In this case, the image processing apparatus 20 receives, from the terminal device 10, the e-mail address as destination information. The image processing apparatus 20 also selects the received e-mail address, as an address being a transmission destination of image data.

Note that, as described in the description on processing, a selection screen may include a determination button. In this case, the user can display the screens illustrated in FIG. 15A and FIG. 15B until the determination button is selected, and select from among a plurality of pieces of destination information.

In addition to the processing described above, the image processing apparatus 20 may also reuse information on an image selected by the user in such a way that the user can repeatedly transmit image data to a certain transmission destination. In this case, the image processing apparatus 20 has a function of authenticating the user, and manages user login and logout. In addition, the image processing apparatus 20 has a function of storing information (e.g., an image name) for identifying an image selected by the user until logout processing for the user is performed, and re-selecting an address (selecting an address that has been used last time) associated with the selected image. When the user performs an operation of selecting an address that has been used last time, the image processing apparatus 20 may transmit, to the terminal device 10, an image name associated with an image that has been selected last time, and receive, from the terminal device 10, destination information associated with the image name.

For example, the image processing apparatus 20 stores structure data "transmitted to a destination "address:img1:img3". At this occasion, when the user performs an operation of transmitting image data to the same address continuously, the image processing apparatus 20 transmits, to the terminal device 10, an instruction (information) "notify only the information associated with "address:img1:img3". At this occasion, the terminal device 10 transmits destination information associated with an image name received from the image processing apparatus 20 by performing the same processing as the processing in Step S254 and Step S256. Thus, the image processing apparatus 20 can execute a job of transmitting image data without causing the user to select destination information from a selection screen, even when image data are repeatedly transmitted to a certain transmission destination by the user.

Note that, in order to allow the user to reconfirm destination information that is repeatedly selected, the image processing apparatus 20 may request the terminal device 10 for information (e.g., an image of address:img1:img3) of an image selected by the user, and may display, on the displayer 240, an image acquired from the terminal device 10. This allows the image processing apparatus 20 to display information (destination information) indicated by an image without taking into consideration a content of an image to be transmitted from the terminal device 10.

Thus, as in the case of the first embodiment, since the image processing apparatus according to the present embodiment can display a selection screen without receiving phone book data, it becomes possible to remove a psychological barrier from the user in transferring destination information. Also, since the image processing apparatus according to the present embodiment can acquire destination information simply by transmitting an image name to a terminal device, it is possible to reduce an amount of data to be transmitted and received in communication with the terminal device. Furthermore, the image processing apparatus according to the present embodiment allows the user to select again (select many times) a transmission destination of image data by transmitting an image name to the terminal device until a determination button is selected, and receiving destination information from the terminal device.

3. Third Embodiment

Next, a third embodiment is described. The third embodiment is an embodiment in which a selection screen is displayed with a part of destination information hidden. The present embodiment can be combined with the first and second embodiments. Processing of hiding a part of destination information may be performed by a terminal device 10 or may be performed by an image processing apparatus 20.

First, a case is described in which the terminal device 10 hides a part of destination information. For example, in the first embodiment, when the terminal device 10 hides a part of destination information, in Step S154 of processing illustrated in FIG. 9, a controller 100 of the terminal device 10 replaces a part of destination information stored in read phone book data with a predetermined symbol. For example, the controller 100 replaces a part of a fax number stored in a phone book with a predetermined symbol (e.g., asterisk). At this occasion, for example, the controller 100 may replace all characters of a fax number except for the first and last two characters with a predetermined symbol, or may replace characters except for the last four characters with a predetermined symbol. Further, a portion to be replaced with a predetermined character can be designated by the user. The controller 100 also generates a display image with a part of destination information hidden.

Figure 14:
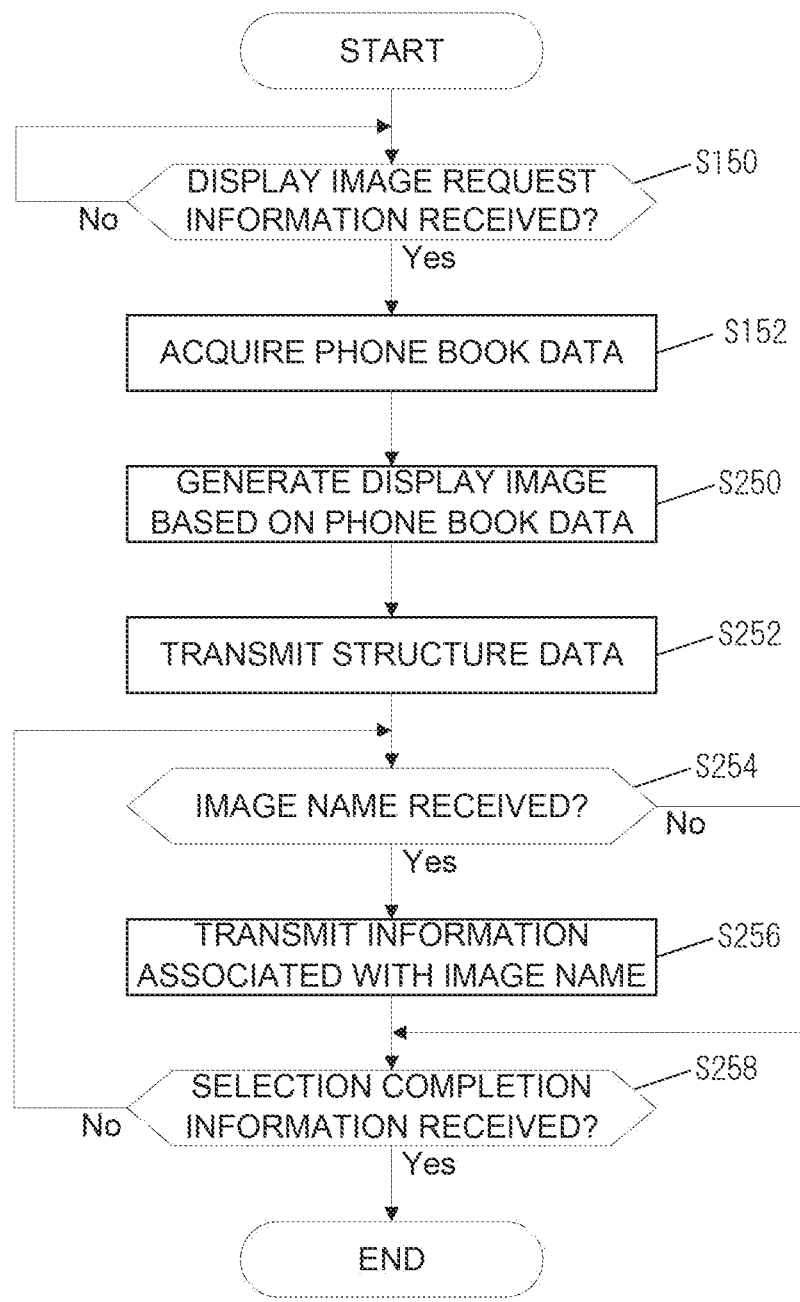
FIG. 14 is a flowchart illustrating a flow of processing of a terminal device according to the second embodiment.

In the second embodiment, when the terminal device 10 hides a part of destination information, in Step S250 of processing illustrated in FIG. 14, the controller 100 of the terminal device 10 replaces a part of destination information with a predetermined symbol, and then, generates a display image.

Thus, the controller 100 generates a display image in which a part of destination information is hidden. Since a selection screen including a display image as described above is displayed by the image processing apparatus 20, a part of destination information is displayed in a hidden state on the selection screen.

Note that, when an operation (display operation) for displaying confidential information is input by the user on the image processing apparatus 20, the controller 100 may transmit, to the image processing apparatus 20, an image in which a part of destination information is not hidden. The display operation is a predetermined gesture such as double tapping or long pressing, and may be defined in advance or may be set by the user. In this case, the controller 100 determines whether a display operation has been performed, based on operation event information to be received from the image processing apparatus 20.

For example, in the first embodiment, when performing Step S158 in FIG. 9, the controller 100 determines whether operation event information including information indicating that a predetermined gesture such as double tapping or long pressing has been performed, and a position at which the gesture has been performed is received from the image processing apparatus 20. In this case, the controller 100 determines whether information indicating an operation included in operation event information is a display operation. When the information indicating the operation is a display operation, the controller 100 determines whether phone book data have been selected based on a position at which the display operation has been performed. When determining that a display operation has been performed for phone book data based on these determinations, the controller 100 generates a display image on a selection screen in which destination information associated with the phone book data is not hidden, and transmits the image to the image processing apparatus 20 via a near field communicator 180. Since the image processing apparatus 20 displays a selection screen including a display image transmitted from the terminal device 10, the user can visually recognize the selection screen in which destination information is not hidden.

Furthermore, when the controller 100 receives, from the image processing apparatus 20, information indicating that a predetermined gesture is no longer detected, the controller 100 transmits, to the image processing apparatus 20, a display image on a selection screen in which destination information associated with phone book data is hidden via the near field communicator 180. By displaying, on a displayer 240 of the image processing apparatus 20, a selection screen including the display image, the user can visually recognize a selection screen in which a part of destination information is hidden by stopping a predetermined gesture.

Figure 12:
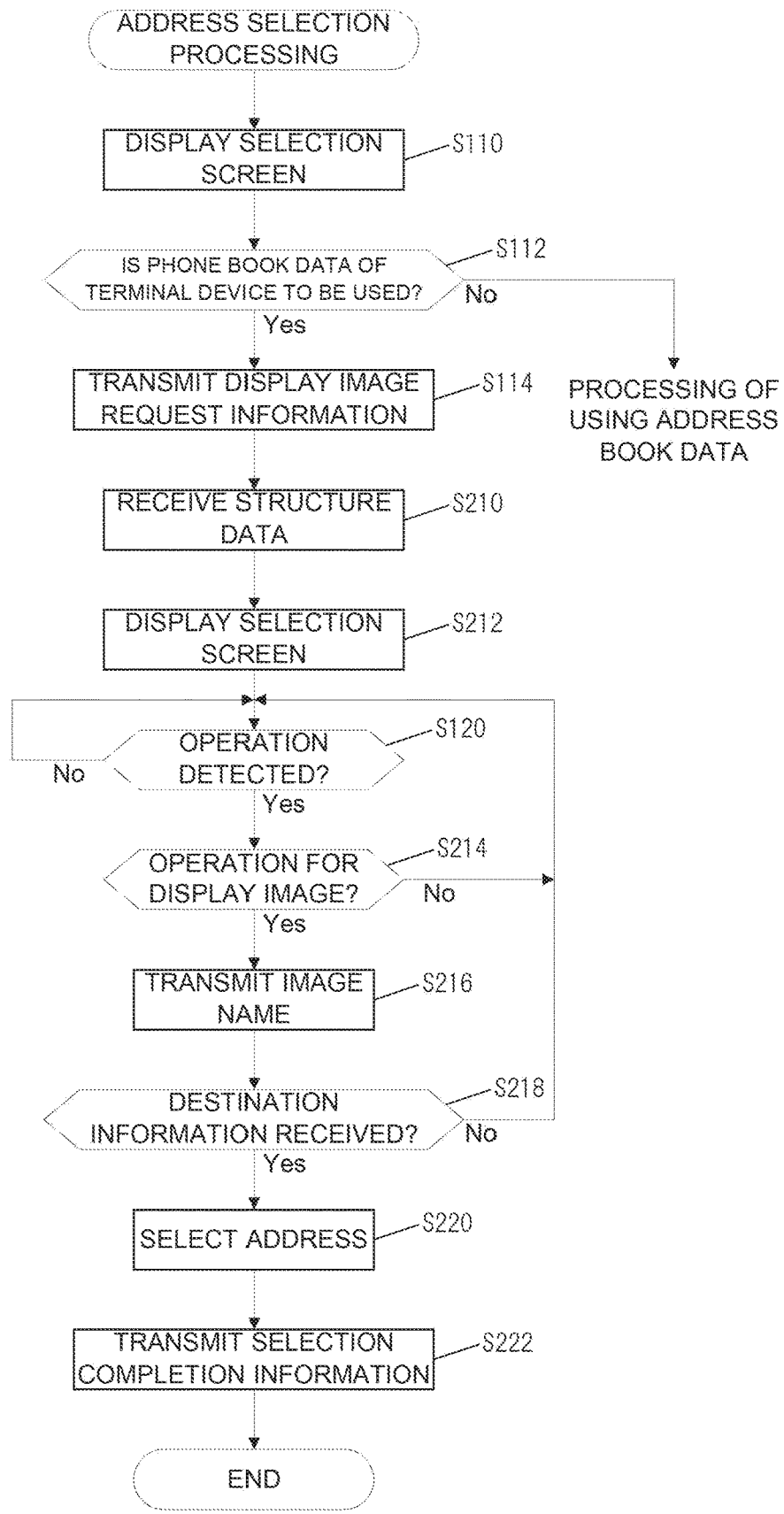
FIG. 12 is a flowchart illustrating a flow of address selection processing according to a second embodiment.

Further, in the second embodiment, in Step S216 of FIG. 12, a controller 200 of the image processing apparatus 20 transmits, to the terminal device 10, information on an operation (e.g., a gesture such as double tapping or long pressing) input by the user together with an image name via a near field communicator 280. The controller 100 of the terminal device 10, in Step S254 of FIG. 14, determines whether an operation input by the user is a display operation. When an operation input by the user is a display operation, the controller 100 generates a display image in which destination information indicated by an image associated with an image name received from the image processing apparatus 20 is not hidden, and transmits the image to the image processing apparatus 20 via the near field communicator 180. In this case, in Step S218 in FIG. 12, the controller 200 of the image processing apparatus 20 replaces the display image received from the terminal device 10 with a display image operated by the user. Note that, when an operation of inputting a gesture by the user is no longer detected, the controller 200 replaces the display image received from the terminal device 10 with a display image displayed before a gesture is input.

Next, a case is described in which the image processing apparatus 20 hides a part of destination information. When the controller 200 of the image processing apparatus 20 displays a selection screen (e.g., Step S118 in FIG. 8, Step S212 in FIG. 12), the controller 200 makes an image at a position where destination information is displayed on a selection screen unviewable by the user.

For example, the controller 200 performs the following processing.

(1) The controller 200 identifies an area including destination information with respect to a display image included in a selection screen.

(2) The controller 200 displays a selection screen in which a part of destination information is hidden by painting a partial area included in the identified area with a predetermined color, applying a blurring filter, or displaying a predetermined image (such as a pattern image) in a superimposed manner.

(3) When an operation (display operation) for displaying confidential information is input by the user, the controller 200 displays a selection screen in which destination information is not hidden by forming an image in which the hidden destination information is not hidden.

(4) When the display operation input in (3) is no longer input, the controller 200 hides the destination information again.

Note that, the controller 200 may identify an area where destination information is displayed by performing character recognition for a selected image, or may receive, from the terminal device 10, an area where destination information is displayed.

By performing processing described above, the controller 200 can display an image received from the terminal device 10 in a state that a part of destination information is hidden, instead of displaying the image as it is.

Figure 16:
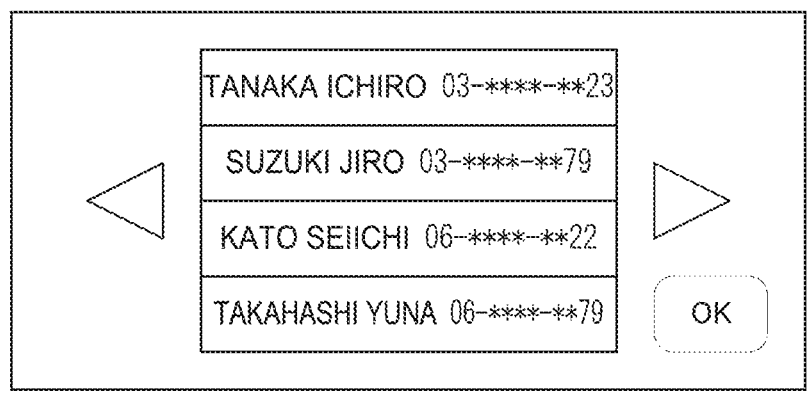
FIG. 16 is a diagram illustrating an operation example according to a third embodiment.

An operation example according to the present embodiment is illustrated in FIG. 16. FIG. 16 is a diagram illustrating a selection screen, when a part of a fax number being destination information is replaced with a predetermined symbol. Since a selection screen as illustrated in FIG. 16 is displayed on the image processing apparatus 20, the user can prevent destination information from being peeped by other users.

Thus, the image processing apparatus according to the present embodiment receives an image from a terminal device with destination information hidden in advance, or keeps destination information confidential with respect to an image received from a terminal device. This reduces the risk of leaking information such as destination information.

Specifically, in general, some characters may be replaced with a predetermined symbol such as "*" on a selection screen in view of preventing peeping, and the like. In this case, it is necessary for an image processing apparatus to know destination information, when generating a selection screen by the image processing apparatus. However, in the present embodiment, the image processing apparatus displays a selection screen by receiving and displaying an image, or performing predetermined processing for a received image, without receiving destination information from a terminal device. This allows the image processing apparatus according to the present embodiment to hide a part of destination information, without having to know a content of an image to be received from the terminal device. Also, since the image processing apparatus can display a selection screen without receiving destination information from the terminal device, it is possible to remove a psychological barrier from the user in transferring destination information.

4. Fourth Embodiment

Next, a fourth embodiment is described. The fourth embodiment is an embodiment in which a terminal device generates a display image on a selection screen that preferentially displays phone book data selected (used) by the user a large number of times, or phone book data that have been selected (used) by the user recently.

First, a case is described in which a terminal device 10 generates a display image on a selection screen that preferentially displays phone book data selected by the user a large number of times. In this case, the terminal device 10 stores, in a storage 160, destination information selected by the user via a selection screen displayed on an image processing apparatus 20, and a history of destination information transmitted to the image processing apparatus 20.

Next, as in the first embodiment, when the terminal device 10 transmits a display image on a selection screen, in Step S154 of processing illustrated in FIG. 9, a controller 100 generates a display image on a selection screen in such a way that phone book data associated with destination information selected by the user a large number of times are preferentially displayed.

For example, the controller 100 generates a display image on a selection screen in such a way that information stored in phone book data associated with destination information that has been selected by the user a large number of times during a predetermined period of time is preferentially displayed. Specifically, when displaying information on phone book data, as an item in a list included in a selection screen, the controller 100 sets an item of a higher rank in the list as an item associated with phone book data associated with destination information that has been selected by the user a large number of times. By causing the image processing apparatus 20 to display a selection screen including a display image as described above, a selection screen on which destination information selected by the user in the past is preferentially displayed is displayed based on the number of times of selection.

When the terminal device 10 transmits structure data to the image processing apparatus 20, as in the second embodiment, the controller 100 transmits structure data in such a way that information stored in phone book data associated with destination information that has been selected by the user a large number of times is preferentially displayed. For example, in Step S252 in FIG. 14, the controller 100 arranges data in which a display image associated with destination information and an image name are associated with each other in the descending order of the number of times of selection of the destination information by the user during a predetermined period of time. Then, the controller 100 transmits, to the image processing apparatus 20, structure data configured by arranging the data in which a display image and an image name are associated with each other.

The image processing apparatus 20 configures a selection screen by arranging, on a selection screen, display images included in structure data according to the order of data included in the received structure data in order from the top.

By causing the terminal device 10 and the image processing apparatus 20 to perform the above-described processing, phone book data used by the user a large number of times are preferentially displayed on a selection screen to be displayed on the image processing apparatus 20 at a higher rank in a list in which the phone book data are arranged. Consequently, a selection screen on which destination information selected by the user in the past is preferentially displayed is displayed based on the number of times of selection.

Next, a case is described in which a display image on a selection screen that preferentially displays phone book data used by the user recently is generated. In this case, the terminal device 10 stores, in the storage 160 of the terminal device 10, a history of destination information used by the user.

In this case, in Step S154 of processing illustrated in FIG. 9, the controller 100 acquires destination information in order of time when the destination information is used by the user recently. Then, the controller 100 generates, based on the acquired destination information, a display image on a selection screen in such a way that information stored in phone book data associated with the destination information is preferentially displayed.

Note that, in Step S252 in FIG. 14, the controller 100 may transmit, to the image processing apparatus 20, structure data configured by arranging data in which a display image associated with destination information and an image name are associated with each other in order of time when the destination information is used by the user recently. The image processing apparatus 20 extracts an image from data included in the received structure data, and configures an image according to the order of arrangement of data in such a way that the image is displayed on a selection screen in order from the top.

By causing the terminal device 10 and the image processing apparatus 20 to perform the above-described processing, phone book data used by the user recently are preferentially displayed on a selection screen to be displayed on the image processing apparatus 20 at a higher rank in a list in which the phone book data are arranged.

Note that, when the controller 100 transmits structure data to the image processing apparatus 20, data included in the structure data in which a display image and an image name are associated with each other may not be arranged in order, but the data may include information (e.g., a number indicating the order of display) indicating the order of arrangement. In this case, the controller 200 of the image processing apparatus 20 displays, on a displayer 240, a selection screen on which display images included in structure data are arranged based on information indicating the order of arrangement in the data.

In the image processing apparatus according to the present embodiment, since a selection screen according to a use status of a user is displayed based on an image received from a terminal device, it is possible to enhance user's convenience, while removing a psychological barrier from the user. In particular, an image and structure data necessary for causing the image processing apparatus to display a selection screen that preferentially displays phone book data frequently used by the user are transmitted by a terminal device. Therefore, the image processing apparatus can display a selection screen customized for the user without having to know a content of an image and structure data received from the terminal device.

5. Fifth Embodiment

Next, a fifth embodiment is described. The fifth embodiment is an embodiment in which a nickname and an image are displayed, as user information to be displayed on a selection screen, instead of a user name.

In the present embodiment, an example of phone book data stored in a phone book data storage area of a terminal device 10 is illustrated in FIG. 17A. As illustrated in FIG. 17A, phone book data store a nickname (e.g., "tanaka@sales department"), and a user image (e.g., "20210310142352.jpg").

A user image is any image such as, for example, a photo, an icon, and an illustration of the user. In addition, phone book data may store image data themselves of a user image, or may store a storage destination (file name) of image data of a user image.

Further, in the present embodiment, when a controller 100 of the terminal device 10 performs processing of generating a display image representing the entirety of a selection screen, or a display image included in a selection screen, the controller 100 generates a display image based on information stored in phone book data. For example, the controller 100 performs the following processing, and generates a display image.

(1) The controller 100 reads one piece of phone book data.

(2) When a user image is stored in the read phone book data, the controller 100 generates an image including a user image and destination information, as an image based on information stored in the phone book data.

(3) When a user image is not stored in the read phone book data, but a nickname is stored, the controller 100 generates an image including the nickname and destination information, as an image based on information stored in the phone book data.

(4) When neither a user image nor a nickname is stored in the read phone book data, the controller 100 generates an image including a user name and destination information, as an image based on information stored in the phone book data.

Figure 17B:
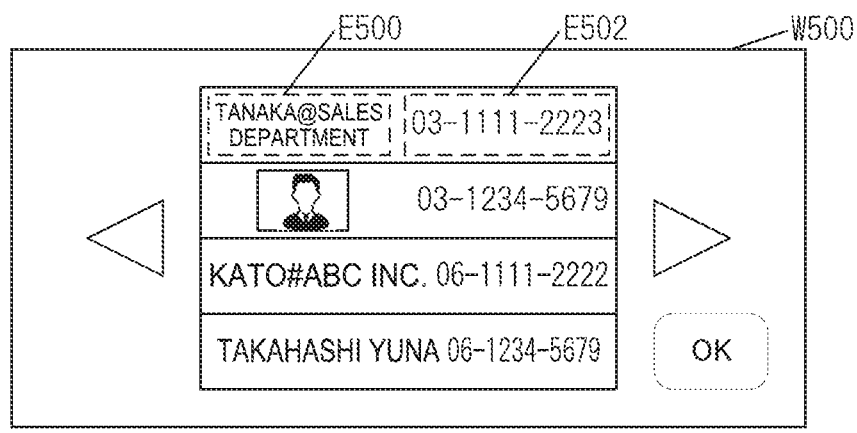
FIG. 17B is a diagram illustrating an operation example according to a fifth embodiment.

In the present embodiment, an example of a selection screen W500 to be displayed on a displayer 240 of the image processing apparatus 20 is illustrated in FIG. 17B. As illustrated in FIG. 17B, for example, a nickname E500 of a user is displayed on the selection screen W500, as information indicating the user. Destination information E502 of the user is also displayed. Note that, as illustrated in FIG. 17B, information indicating the user may be an image (user image) of the user, or may be a user name.

According to the present embodiment, a user image or a nickname is displayed as a name of a destination on a selection screen, instead of a user name. This makes it easier for the user to select a user as a destination of image data. Also, since the image processing apparatus receives, from the terminal device, a display image representing the entirety of a selection screen, or a display image included in a selection screen, it becomes possible to display a selection screen attached with information (e.g., a nickname or a user image) that is not managed by the image processing apparatus.

6. Sixth Embodiment

Next, a sixth embodiment is described. The sixth embodiment is an embodiment in which phone book data (destination information) to be displayed on a selection screen can be reordered or classified (narrowed down) by a predetermined method.

In the present embodiment, description is made based on a premise that a reordering method (reordering rule) or a classification method of phone book data (destination information) to be displayed on a selection screen is a method used as a method of reordering phone book data in a terminal device 10. For example, when the terminal device 10 is capable of reordering and displaying phone book data in order of furigana, or classifying and displaying the data for each company in the terminal device 10, the terminal device 10 causes an image processing apparatus 20 to display a selection screen that allows reordering in order of furigana, or classifying for each company.

For example, as in the first embodiment, when the terminal device 10 transmits a display image representing the entirety of a selection screen, the terminal device 10 performs the following processing.

(1) In Step S154 in FIG. 9, a controller 100 generates a display image on a selection screen including a button that allows selection of a reordering method or a classification method of phone book data used in the terminal device 10.

(2) In Step S160 in FIG. 9, when an element selected by the user is a button that allows selection of a reordering method or a classification method, the controller 100 reorders or classifies phone book data by the selected method.

The controller 100 also generates a selection screen based on the reordered or classified phone book data. Furthermore, the controller 100 transmits a display image on the generated selection screen to the image processing apparatus 20.

On the other hand, as in the case of the second embodiment, when the terminal device 10 transmits structure data to the image processing apparatus 20, the terminal device 10 and the image processing apparatus 20 perform the following processing.

(1) In Step S252 in FIG. 14, the controller 100 transmits, to the image processing apparatus 20, information indicating a reordering method or a classification method of phone book data used in the terminal device 10 together with structure data.

(2) In Step S212 in FIG. 12, a controller 200 displays a selection screen including a button associated with a reordering method or a classification method received together with structure data, along with a display image included in the structure data.

(3) In Step S214 in FIG. 12, when a user's operation is an operation for a button that allows selection of a reordering method, the controller 200 transmits, to the terminal device 10, information indicating a reordering method or a classification method selected by the user.

(4) The controller 100 of the terminal device 10 reorders or classifies (narrows down) phone book data according to a reordering method or a classification method transmitted by the image processing apparatus 20. Structure data configured by arranging data in which a display image and an image name are associated with each other are transmitted to the image processing apparatus 20, based on the reordered phone book data.

(5) The controller 200 of the image processing apparatus 20 displays, on a displayer 240, a selection screen based on the received structure data.

Figure 18:
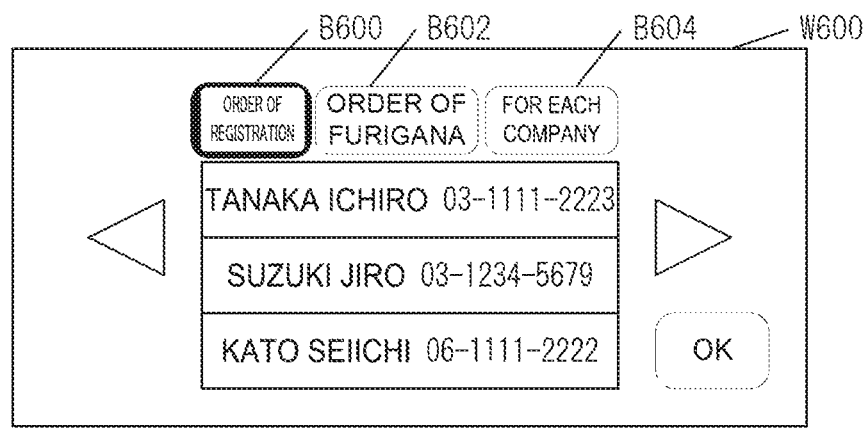
FIG. 18 is a diagram illustrating an operation example according to a sixth embodiment.

By performing the above-described processing, the user can reorder phone book data to be displayed on a selection screen. An operation example according to the present embodiment is illustrated in FIG. 18. FIG. 18 is a diagram illustrating a selection screen W600 according to the present embodiment. As illustrated in FIG. 18, a button B600, a button B602, and a button B604 that allow selection of a reordering method or a classification method of phone book data are displayed on the selection screen W600. By allowing the user to select a button from among these buttons, the user can reorder phone book data in order of registration or in order of furigana, or classify the data for each company.

In the image processing apparatus according to the present embodiment, the image processing apparatus according to the present embodiment can remove a psychological barrier from the user, and display a highly convenient selection screen. In particular, in the present embodiment, a selection screen that allows reordering or classification based on phone book data stored in a terminal device is displayed, as a method different from a method of reordering address book data in the image processing apparatus. Therefore, the user can reorder and display, or classify and display phone book data, on a selection screen, based on a content of phone book data stored in the terminal device, regardless of an image processing apparatus in use. Consequently, the user can use the reordering method or the classification method used in the terminal device as it is, on a selection screen to be displayed on the image processing apparatus, without restriction regarding destination information as to whether the method is a reordering method or a classification method in the image processing apparatus. The image processing apparatus also allows the user to use the reordering method or the classification method used in the terminal device, on a selection screen, without having to know the reordering method or the classification method used in the terminal device.

7. Seventh Embodiment

Next, a seventh embodiment is described. The seventh embodiment is an embodiment in which phone book data to be displayed on a selection screen can be reordered or classified (narrowed down) by a method used as a reordering method or a classification method of address book data to be managed by an image processing apparatus.

In the present embodiment, when an image processing apparatus 20 transmits display image request information to a terminal device 10, the image processing apparatus 20 transmits a user-selectable reordering method, as a reordering method of address book data together with the display image request information. The reordering method of address book data is, for example, a method based on information to be stored in address book data, such as an order of registration, an order of names, and presence or absence of a memo.

As in the first embodiment, when the terminal device 10 transmits a display image on a selection screen, the terminal device 10 performs the following processing.

(1) In Step S154 in FIG. 9, a controller 100 generates a display image on a selection screen including a button that allows selection of a reordering method included in display image request information.

(2) In Step S160 in FIG. 9, when an element selected by the user is a button that allows selection of a reordering method, the controller 100 reorders phone book data according to the selected reordering method, and generates a selection screen based on the reordered phone book data. Further, the controller 100 transmits, to the image processing apparatus 20, a display image on the generated selection screen.

On the other hand, as in the second embodiment, when the terminal device 10 transmits structure data to the image processing apparatus 20, the terminal device 10 and the image processing apparatus 20 perform the following processing.

(1) In Step S212 in FIG. 12, a controller 200 displays, on a displayer 240, a selection screen including a button that allows the user to select a reordering method.

(2) In Step S214 in FIG. 12, when a user's operation is an operation for a button that allows selection of a reordering method, the controller 200 transmits the reordering method selected by the user to the terminal device 10.

(3) The controller 100 of the terminal device 10 reorders phone book data according to the reordering method transmitted by the image processing apparatus 20, and transmits, to the image processing apparatus 20, structure data configured by arranging data in which a display image and an image name are associated with each other, based on the reordered phone book data.

(4) The controller 200 of the image processing apparatus 20 displays, on the displayer 240, a selection screen based on the received structure data.

Note that, when phone book data cannot be reordered by the same method as an address book data reordering method, the controller 100 may transmit, to the image processing apparatus 20, a display image on a selection screen indicating that data cannot be reordered, or information indicating that data cannot be reordered.

Figure 19:
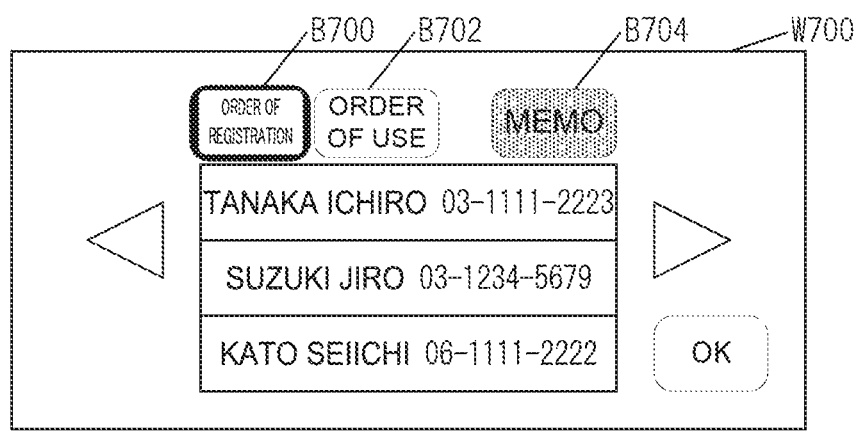
FIG. 19 is a diagram illustrating an operation example according to a seventh embodiment.

By performing the above-described processing, the user can reorder phone book data to be displayed on a selection screen. An operation example according to the present embodiment is illustrated in FIG. 19. FIG. 19 is a diagram illustrating a selection screen W700 according to the present embodiment. As illustrated in FIG. 19, a button B700 and a button B702 that allow selection of a method of reordering phone book data are displayed on the selection screen W700. By allowing the user to select the button B700 or B702, the user can reorder phone book data in order of registration or in order of use.

As exemplified by the button B704, a button associated with a reordering method in which phone book data cannot be reordered by the same method as an address book data reordering method may be made unselectable. For example, when phone book data do not include memo information, it is not possible to reorder the phone book data according to presence or absence of a memo. In this case, the controller 100 transmits, to the image processing apparatus 20, a display image on a selection screen indicating that data cannot be reordered by presence or absence of a memo, or information indicating that data cannot be reordered by presence or absence of a memo.

According to the present embodiment, an image processing apparatus can display a selection screen without receiving destination information from a terminal device, and can also display a selection screen that allows reordering phone book data by the same method as a method of reordering address book data in the image processing apparatus. Therefore, the image processing apparatus according to the present embodiment can remove a psychological barrier from the user, and also display a highly convenient selection screen.

8. Eighth Embodiment

Next, an eighth embodiment is described. The eighth embodiment is an embodiment in which, when phone book data are managed in a terminal device for each of a plurality of groups, such as for each account, the phone book data are made selectable on an image processing apparatus, while switching among the groups (accounts) of phone book data. Note that, the present embodiment is described based on a premise that a group that manages phone book data is generated for each account, and one or more phone books are managed for each account.

In the present embodiment, an example of phone book data stored in a phone book data storage area of a terminal device 10 is illustrated in FIG. 20A. As illustrated in FIG. 20A, an account name (e.g., "user1") indicating an account (account to which phone book data belong) to be managed by the phone book data is stored in the phone book data.

Further, as in the first embodiment, when the terminal device 10 transmits a display image representing the entirety of a selection screen, in the present embodiment, a display image on the selection screen including a button that selects an account is generated and transmitted to an image processing apparatus 20. Also, when operation event information received from the image processing apparatus 20 is information indicating an operation of selecting the button that selects an account, the terminal device 10 reads phone book data managed by the account selected by the user. Then, the terminal device 10 generates a display image on a selection screen based on the read phone book data, and transmits the display image to the image processing apparatus 20. The display image in this case is a display image including destination information associated with the account selected by the user. Since a display image as described above is displayed by the image processing apparatus 20, a selection screen including destination information associated with an account selected by the user is displayed on a displayer 240.

On the other hand, as in the second embodiment, when the terminal device 10 transmits structure data to the image processing apparatus 20, the terminal device 10 transmits, to the image processing apparatus 20, an account name stored in phone book data. The image processing apparatus 20 displays, on the displayer 240, a selection screen including a button indicating the account name received from the terminal device 10. At this occasion, when a button indicating an account name is selected by the user, the image processing apparatus 20 transmits the selected account name to the terminal device 10. The terminal device 10 generates structure data based on phone book data in which the account name received from the image processing apparatus 20 is stored, and transmits the structure data to the image processing apparatus 20. Structure data in this case include a display image associated with phone book data associated with the account selected by the user, and information for identifying the display image (e.g., an image name). Since a selection screen based on structure data as described above is displayed by the image processing apparatus 20, a selection screen including destination information associated with an account selected by the user is displayed on the displayer 240.

Figure 20B:
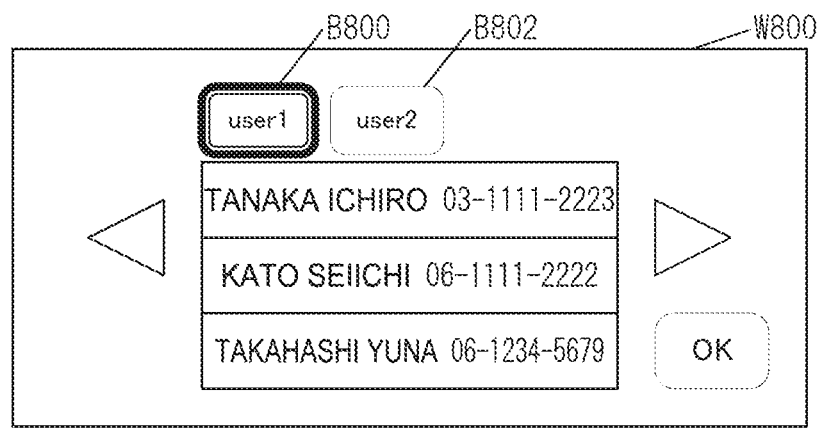
FIGS. 20B and 20C are diagrams illustrating an operation example according to an eighth embodiment.
Figure 20C:
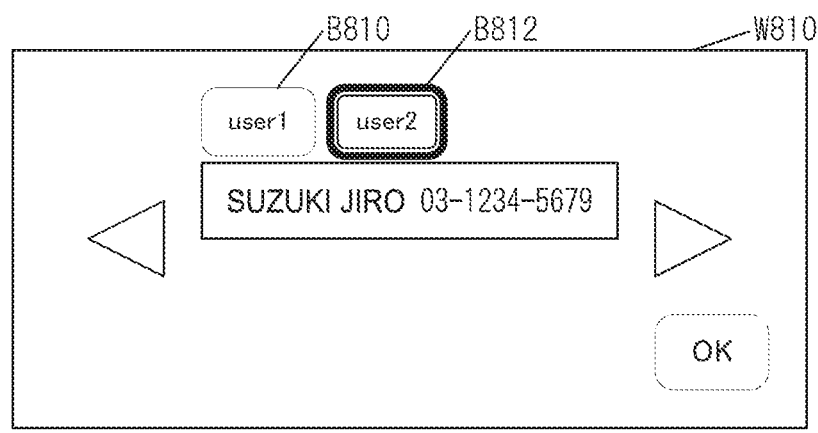

FIGS. 20B and 20C are diagrams illustrating selection screens according to the present embodiment. A selection screen W800 illustrated in FIG. 20B is a selection screen on which phone book data managed by the account whose account name is "user1" are displayed. As illustrated in FIG. 20B, the selection screen W800 includes a button B800 and a button B802 that select an account. Also, the button B800 indicating a currently selected account is displayed in a highlighted manner. By confirming the button B800, the user can recognize that the phone book data displayed on the selection screen are phone book data managed by the account whose account name is "user1".

FIG. 20C is a diagram illustrating a selection screen W810 to be displayed when the button B802 is selected on the selection screen W800. Phone book data managed by an account whose account name is "user2" are displayed on the selection screen W810. Also, as illustrated in FIG. 20C, the selection screen W810 includes a button B810 and a button B812 that select an account, and the button B812 indicating a currently selected account is displayed in a highlighted manner.

Thus, according to the present embodiment, even when phone book data are managed in a terminal device for each of a plurality of groups (accounts), the user can display only phone book data belonging to a group by selecting the group on an image processing apparatus.

9. Modification Example

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

Although some of the above-described embodiments are described separately for convenience of explanation, it is needless to say that combining and implementing the embodiments within a technically allowable range is also possible. For example, the third embodiment and the fourth embodiment may be combined. In this case, an image processing apparatus can display a selection screen according to a use status of a user, and hide a part of destination information to be displayed on the selection screen.

Further, processing (operation) to be performed by a terminal device and an image processing apparatus described in the above-described embodiments may be selectable by the user. For example, a control application allows the user to select an operation of making destination information described in the third embodiment confidential, an operation of preferentially displaying phone book data described in the fourth embodiment, and an operation of displaying a nickname and the like in the fifth embodiment. The control application also allows the user to select whether to enable reordering of phone book data described in the sixth and seventh embodiments, and whether to enable switching of groups of phone book data described in the eighth embodiment. In this case, the control application controls the terminal device to perform an operation selected by the user, or transmits necessary information to the image processing apparatus.

In addition, a program operating in each device in the embodiments is a program (a program causing a computer to function) that controls a CPU or the like in such a way as to achieve functions of the above-described embodiments. Information to be handled by these devices is temporarily stored in a temporary storage device (e.g., a RAM) at the time of processing, and thereafter, is stored in a storage device such as various read only memories (ROMs) and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disk (BD), and the like), or a magnetic recording medium (e.g., a magnetic tape, a flexible disk, and the like). In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

What is claimed is:

1. An image processing apparatus comprising one or more controllers, a displayer, a communicator, and a near field communicator, wherein
the one or more controllers
receive, from a terminal device, a display image associated with destination information stored in the terminal device, via the near field communicator,
display a screen including the display image on the displayer,
receive the destination information stored in the terminal device, based on an operation input of selecting the destination information on the screen of the image processing apparatus without an operation input of selecting the destination information on the terminal device, and
transmit an image for transmission via the communicator, based on the destination information received from the terminal device.

2. The image processing apparatus according to claim 1, wherein
the display image includes a list including a plurality of pieces of the destination information.

3. The image processing apparatus according to claim 1, wherein
the display image is an image indicating the destination information, and
the one or more controllers further cause the displayer to display the screen on which the display image is arranged.

4. The image processing apparatus according to claim 1, wherein
the one or more controllers further display the screen with a part of the destination information hidden.

5. The image processing apparatus according to claim 4, wherein
when a display operation of displaying the hidden destination information is performed, the one or more controllers further display the screen on which the hidden destination information is not hidden.

6. The image processing apparatus according to claim 5, wherein
the one or more controllers further receive, from the terminal device, the display image in which a part of the destination information is hidden, and display the screen including the display image, and
when the display operation is performed, the one or more controllers receive, from the terminal device, the display image in which the destination information is not hidden, and display the screen including the display image.

7. The image processing apparatus according to claim 5, wherein
the one or more controllers further display the screen in which a part of the display image is hidden, and when the display operation is performed, the one or more controllers display the screen in which a part of the display image is not hidden.

8. The image processing apparatus according to claim 1, wherein
the one or more controllers further display the screen on which the destination information selected by a user in the past is preferentially displayed.

9. The image processing apparatus according to claim 1, wherein
the one or more controllers further display, on the screen, at least one of a user name, a nickname, and an image associated with the destination information, together with the destination information.

10. The image processing apparatus according to claim 1, wherein
the one or more controllers further display the screen on which the destination information is reordered by a predetermined method.

11. The image processing apparatus according to claim 10, wherein
the one or more controllers further display the screen on which the destination information is reordered by a method used as a method of reordering the destination information in the terminal device.

12. The image processing apparatus according to claim 1, wherein
the destination information is managed for each account, and
the one or more controllers further display the screen including the destination information associated with an account selected by a user.

13. The image processing apparatus according to claim 1, wherein the display image is an image generated in the terminal device.

14. The image processing apparatus according to claim 1, wherein the one or more controllers further transmit, to the terminal device, an operation event information based on an event detected in the display image, and the terminal device receives the destination information specified based on the operation event information.

15. A control method comprising:
receiving, from a terminal device, a display image associated with destination information stored in the terminal device, by near field communication;
displaying a screen including the display image;
receiving the destination information stored in the terminal device, based on an operation input of selecting the destination information on the screen without an operation input of selecting the destination information on the terminal device; and
transmitting an image for transmission, based on the destination information received from the terminal device.

16. A system comprising a terminal device, and an image processing apparatus, wherein
the terminal device
transmits, to the image processing apparatus, a display image associated with destination information, and
when information, indicating an operation input of selecting the destination information on a screen of the image processing apparatus that includes the display image without an operation input of selecting the destination information on the terminal device, is received from the image processing apparatus, transmits, to the image processing apparatus, the destination information associated with the operation, the destination information being stored in the terminal device, and
the image processing apparatus
displays a screen including the display image, and
transmits, to the terminal device, information indicating the operation input on the screen, and transmits an image for transmission, based on the destination information received from the terminal device.

\* \* \* \* \*